US012442891B2

(12) United States Patent
Zhang et al.

(10) Patent No.: US 12,442,891 B2
(45) Date of Patent: Oct. 14, 2025

(54) RADAR INTERFERENCE MITIGATION

(71) Applicant: QUALCOMM Incorporated, San Diego, CA (US)

(72) Inventors: Dan Zhang, San Diego, CA (US); Kapil Gulati, Belle Mead, NJ (US); Junyi Li, Franklin Park, NJ (US)

(*) Notice: Subject to any disclaimer, the term of this patent is extended or adjusted under 35 U.S.C. 154(b) by 175 days.

(21) Appl. No.: 17/243,518

(22) Filed: Apr. 28, 2021

(65) Prior Publication Data
US 2022/0349985 A1   Nov. 3, 2022

(51) Int. Cl.
*G01S 7/02* (2006.01)
*G01S 7/00* (2006.01)
*G01S 7/35* (2006.01)
*G01S 13/931* (2020.01)

(52) U.S. Cl.
CPC ............ *G01S 7/023* (2013.01); *G01S 7/006* (2013.01); *G01S 7/0232* (2021.05); *G01S 7/0235* (2021.05); *G01S 7/354* (2013.01); *G01S 13/931* (2013.01); *G01S 2013/9316* (2020.01)

(58) Field of Classification Search
CPC ...... G01S 7/023; G01S 7/0232; G01S 7/0235; G01S 7/006; G01S 7/354; G01S 13/931; G01S 2013/9316
USPC .......................................................... 342/52
See application file for complete search history.

(56) References Cited

U.S. PATENT DOCUMENTS

| 3,831,174 A * | 8/1974 | King | G01S 13/528 |
| | | | 342/104 |
| 3,911,432 A * | 10/1975 | Williams | G01S 7/0235 |
| | | | 342/59 |
| 5,815,250 A * | 9/1998 | Thomson | G01S 17/10 |
| | | | 356/28 |
| 7,304,603 B2 * | 12/2007 | Reed | G01S 13/887 |
| | | | 342/160 |
| 7,928,897 B2 * | 4/2011 | Ishii | G01S 13/345 |
| | | | 342/127 |

(Continued)

FOREIGN PATENT DOCUMENTS

| CN | 111521975 B | * 9/2022 | ........... G01S 13/343 |
| DE | 102014226127 A1 | 6/2016 | |
| EP | 3767331 A1 | 1/2021 | |

OTHER PUBLICATIONS

International Search Report and Written Opinion—PCT/US2022/025805—ISA/EPO—Jul. 22, 2022 (207128WO).

*Primary Examiner* — Michael W Justice

(57) ABSTRACT

Methods, systems, and devices for wireless communications are described. Generally, a user equipment (UE) (e.g., a vehicle) may determine a configuration, including an offset value for the radar waveform, for transmitting a radar waveform for multiple radar transmitters. The UE may transmit, according to the identified configuration, a first instance of the radar waveform with a first radar transmitter. The UE may also transmit a second instance of the radar waveform with a second radar transmitter. The second instance of the radar waveform may be offset from the first instance of the radar waveform by the offset value. The Offset value may be a time offset, a frequency offset, or both. The UE may identify at least one object, and may filter our interference between the first instance of the radar waveform and the second instance of the radar waveform based on the offset.

27 Claims, 13 Drawing Sheets

(56) References Cited

U.S. PATENT DOCUMENTS

| | | | | |
|---|---|---|---|---|
| 7,982,661 B2* | 7/2011 | Beasley | ............... | G01S 7/4056 |
| | | | | 342/194 |
| 9,645,230 B2* | 5/2017 | Shirakawa | ............ | G01S 7/0235 |
| 9,689,967 B1* | 6/2017 | Stark | ..................... | G01S 7/0233 |
| 9,945,943 B2* | 4/2018 | Stark | ..................... | G01S 7/0233 |
| 9,971,028 B2 | 5/2018 | Park | | |
| 10,215,853 B2* | 2/2019 | Stark | .................... | H04B 17/345 |
| 10,234,540 B2* | 3/2019 | Kim | ..................... | G01S 13/343 |
| 10,234,541 B2* | 3/2019 | Goda | ...................... | G01S 7/352 |
| 10,317,518 B2* | 6/2019 | Warnick | ................. | G01S 13/42 |
| 11,061,126 B2* | 7/2021 | Ray | .................... | H04L 27/3863 |
| 12,038,523 B2* | 7/2024 | Gulati | .................... | G01S 7/023 |
| 2002/0061081 A1* | 5/2002 | Richards | ............... | H04B 1/719 |
| | | | | 375/E1.001 |
| 2007/0194976 A1* | 8/2007 | Reed | ...................... | G01S 7/411 |
| | | | | 342/188 |
| 2008/0106458 A1 | 5/2008 | Honda et al. | | |
| 2009/0224960 A1* | 9/2009 | Ishii | ...................... | G01S 13/345 |
| | | | | 342/104 |
| 2009/0251361 A1* | 10/2009 | Beasley | ............... | G01S 7/4056 |
| | | | | 342/194 |
| 2012/0146844 A1* | 6/2012 | Stirling-Gallacher | ....................... | |
| | | | | G01S 13/343 |
| | | | | 342/189 |
| 2013/0234880 A1* | 9/2013 | Lee | ...................... | G01S 13/931 |
| | | | | 342/70 |
| 2015/0070204 A1* | 3/2015 | Shirakawa | ............ | G01S 7/0234 |
| | | | | 342/128 |
| 2016/0061935 A1 | 3/2016 | McCloskey et al. | | |
| 2016/0223645 A1* | 8/2016 | Kim | ...................... | G01S 13/345 |
| 2017/0293027 A1* | 10/2017 | Stark | ....................... | G01S 13/87 |
| 2017/0307727 A1* | 10/2017 | Goda | ..................... | G01S 13/584 |
| 2018/0011180 A1* | 1/2018 | Warnick | ............... | H01Q 21/064 |
| 2018/0231655 A1* | 8/2018 | Stark | ....................... | H04B 17/309 |
| 2019/0293748 A1* | 9/2019 | Gulati | ..................... | G01S 7/023 |
| 2019/0391247 A1* | 12/2019 | Gulati | ................... | G01S 13/341 |
| 2020/0142033 A1* | 5/2020 | Shand | ................... | G01S 7/484 |
| 2020/0309933 A1* | 10/2020 | Ray | ...................... | G01S 13/282 |
| 2021/0173042 A1* | 6/2021 | Wu | ........................ | G01S 7/356 |
| 2021/0173069 A1* | 6/2021 | Wu | ...................... | G01S 13/343 |
| 2021/0356556 A1* | 11/2021 | Gao | ...................... | G01S 13/872 |
| 2021/0356580 A1* | 11/2021 | Song | ...................... | G01S 13/38 |
| 2022/0308159 A1* | 9/2022 | Gulati | ..................... | G01S 7/023 |

* cited by examiner

RADAR INTERFERENCE MITIGATION

FIELD OF TECHNOLOGY

The following relates to wireless communications, including radar interference mitigation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, one or more UEs (e.g., vehicles) may utilize radar signaling for ranging and other applications.

SUMMARY

The described techniques relate to improved methods, systems, devices, and apparatuses that support radar interference mitigation. Generally, a user equipment (UE) (e.g., a vehicle) may utilize radar signaling for one or more applications (e.g., ranging procedures, safety procedures, or the like). The UE may determine a configuration for transmitting a radar waveform for multiple radar transmitters. The configuration may indicate an offset value for the radar waveform between the multiple radar transmitters. The UE may transmit, according to the identified configuration, a first instance of the radar waveform with a first radar transmitter. The UE may also transmit a second instance of the radar waveform with a second radar transmitter. The second instance of the radar waveform may be offset from the first instance of the radar waveform by the offset value. The offset value may be a time offset, a frequency offset, or a combination of both. The UE may identify at least one object based on transmitting the first instance of the radar waveform, the second instance of the radar waveform, or both. In some cases, the UE may filter our interference between the first instance of the radar waveform and the second instance of the radar waveform based on the offset.

A method of wireless communications at a vehicle is described. The method may include determining a configuration for transmitting a radar waveform by a set of radar transmitters of the vehicle, the configuration indicating an offset value for the radar waveform between a first radar transmitter of the set of radar transmitters and a second radar transmitter of the set of radar transmitters, transmitting, by the first radar transmitter, a first instance of the radar waveform, transmitting, by the second radar transmitter, a second instance of the radar waveform that is offset from the first instance of the radar waveform by the offset value, and identifying at least one object based on transmitting the first instance of the radar waveform, or the second instance of the radar waveform, or both.

An apparatus for wireless communications at a vehicle is described. The apparatus may include a processor, memory coupled with the processor, and instructions stored in the memory. The instructions may be executable by the processor to cause the apparatus to determine a configuration for transmitting a radar waveform by a set of radar transmitters of the vehicle, the configuration indicating an offset value for the radar waveform between a first radar transmitter of the set of radar transmitters and a second radar transmitter of the set of radar transmitters, transmit, by the first radar transmitter, a first instance of the radar waveform, transmit, by the second radar transmitter, a second instance of the radar waveform that is offset from the first instance of the radar waveform by the offset value, and identify at least one object based on transmitting the first instance of the radar waveform, or the second instance of the radar waveform, or both.

Another apparatus for wireless communications at a vehicle is described. The apparatus may include means for determining a configuration for transmitting a radar waveform by a set of radar transmitters of the vehicle, the configuration indicating an offset value for the radar waveform between a first radar transmitter of the set of radar transmitters and a second radar transmitter of the set of radar transmitters, transmitting, by the first radar transmitter, a first instance of the radar waveform, transmitting, by the second radar transmitter, a second instance of the radar waveform that is offset from the first instance of the radar waveform by the offset value, and identifying at least one object based on transmitting the first instance of the radar waveform, or the second instance of the radar waveform, or both.

A non-transitory computer-readable medium storing code for wireless communications at a vehicle is described. The code may include instructions executable by a processor to determine a configuration for transmitting a radar waveform by a set of radar transmitters of the vehicle, the configuration indicating an offset value for the radar waveform between a first radar transmitter of the set of radar transmitters and a second radar transmitter of the set of radar transmitters, transmit, by the first radar transmitter, a first instance of the radar waveform, transmit, by the second radar transmitter, a second instance of the radar waveform that is offset from the first instance of the radar waveform by the offset value, and identify at least one object based on transmitting the first instance of the radar waveform, or the second instance of the radar waveform, or both.

Some examples of the method, apparatuses, and non-transitory computer-readable medium described herein may further include operations, features, means, or instructions for identifying a range value based on a filtering bandwidth value, and determining, based on the range value, the offset value.

In some examples of the method, apparatuses, and non-transitory computer-readable medium described herein, the range value includes a maximum range value.

Some examples of the method, apparatuses, and non-transitory computer-readable medium described herein may further include operations, features, means, or instructions for identifying interference generated by transmitting the first instance of the radar waveform and transmitting the second instance of the radar waveform, and applying a filter to the interference based on the offset value, where identifying the at least one object may be based on applying the filter.

In some examples of the method, apparatuses, and non-transitory computer-readable medium described herein, the offset value includes a time offset.

In some examples of the method, apparatuses, and non-transitory computer-readable medium described herein, the offset value includes a frequency offset.

In some examples of the method, apparatuses, and non-transitory computer-readable medium described herein, the offset value includes a combination of a time offset and a frequency offset.

Some examples of the method, apparatuses, and non-transitory computer-readable medium described herein may further include operations, features, means, or instructions for determining that the third radar transmitter, the fourth radar transmitter, or both, do not interfere with the first radar transmitter and the second radar transmitter, transmitting, by the third radar transmitter, a third instance of the radar waveform, and transmitting, by the fourth radar transmitter, a fourth instance of the radar waveform that may be offset from the third instance of the radar waveform by the second offset value.

In some examples of the method, apparatuses, and non-transitory computer-readable medium described herein, the configuration indicates one or more of a set of radar waveform chirps, a radar waveform carrier frequency range, a radar waveform frequency sweeping direction, a radar waveform frequency sweeping rate, or any combination thereof.

Some examples of the method, apparatuses, and non-transitory computer-readable medium described herein may further include operations, features, means, or instructions for identifying a range to the at least one object, a speed of the at least one object, a direction of the at least one object, or a combination thereof, based on transmitting the first instance of the radar waveform, or the second instance of the radar waveform, or both.

In some examples of the method, apparatuses, and non-transitory computer-readable medium described herein, the radar waveform includes a frequency modulated continuous wave.

In some examples of the method, apparatuses, and non-transitory computer-readable medium described herein, the frequency modulated continuous wave includes a triangle wave that rises from a first frequency to a second frequency over a first time duration and falls from the second frequency to the first frequency over a second time duration.

DETAILED DESCRIPTION

Figure 1:
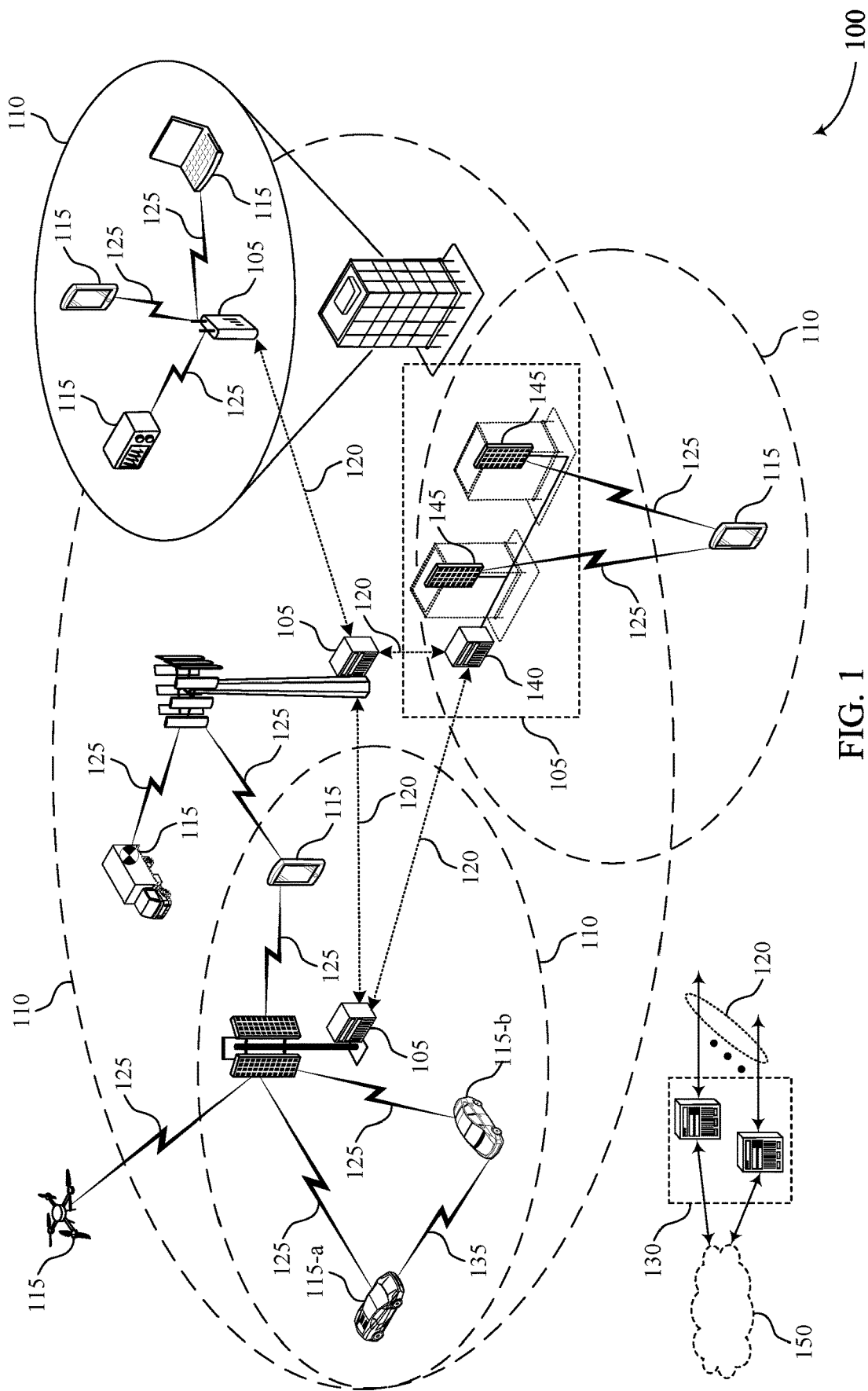
FIG. 1 illustrates an example of a system for wireless communications that supports radar interference mitigation in accordance with aspects of the present disclosure.

Vehicles may use radar to identify objects, object direction, object velocity, etc. Vehicles may transmit a radar waveform and monitor for reflections of the radar waveform (for example, a commonly used waveform for vehicle radar systems is frequency modulated continuous wave (FMCW)). Each transmitted radar waveform may be transmitted in chirps that sweep in frequency over time. The same chirps may be received after a time delay. The delay may be proportional to a range between the vehicle and a detected object. The vehicles may identify a frequency difference between the transmitted chirps and the received chirps, and identify a range value based thereon. For example, the UE may receive the chirps and isolate a beat frequency. The location of the beat frequency may be used to identify the location of an object. However, vehicles may transmit multiple radar waveforms in multiple directions, and a radar waveform transmitted in one direction by the vehicle may interfere with another radar waveform transmitted in another direction. This interference may cause a timing delay between a transmitted waveform and a received waveform, which may result in an interference beat frequency. A beat frequency that results from interference may falsely identify an object where no object actually exists. Such beat frequencies resulting from interference may be referred to herein as a "ghost object." In some cases, interference may cover or obscure a beat frequency resulting from a real object, making the object unidentifiable.

In some use cases, vehicles may transmit instances of the same radar waveform offset from each other by an offset value. For instance, different radar transmitters of the vehicle oriented in different directions may transmit various instances of the radar waveform, and each instance of the radar waveform may be offset from the next instance of the radar waveform by the offset value. The offset value may be a time offset, a frequency offset, or a combination of both. Transmitting the radar waveforms offset from each other may result in predictable false or ghost objects located outside a maximum range value (e.g., a range of interest or a filtered range). That is, by applying the offset to transmission of the radar waveform in different directions, the vehicle may filter out ghost objects and false targets generated by interference from other radar transmitters. In some examples, the vehicle may identify which radar transmitters interfere with each other, and may apply the offset to only those radar transmitters.

Particular aspects of the subject matter described herein may be implemented to realize one or more advantages. The described techniques may support improvements in system efficiency, such that vehicles may experience improved safety procedures and increased safety for vehicle occupants, increased efficiency and speed of adopting safety procedures, decreased power expenditures (e.g., from safety procedures deployed in response to a detected ghost object that is not in fact present), avoided collisions, or the like.

Aspects of the disclosure are initially described in the context of wireless communications systems. Aspects of the disclosure are further illustrated by and described with reference to device diagrams, waveform configurations, and waveform transmission schemes. Aspects of the disclosure are further illustrated by and described with reference to apparatus diagrams, system diagrams, and flowcharts that relate to radar interference mitigation.

FIG. 1 illustrates an example of a wireless communications system 100 that supports radar interference mitigation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, UE 115 (e.g., UE 115-a and UE 115-b, which may be vehicles in some examples) may use radar signaling for one or more applications (e.g., ranging procedures, safety procedures, or the like). UE 115-a may determine a configuration for transmitting a radar waveform for multiple radar transmitters. The configuration may indicate an offset value for the radar waveform between the multiple radar transmitters. 115-a may transmit, according to the identified configuration, a first instance of the radar waveform with a first radar transmitter. UE 115-a may also transmit a second instance of the radar waveform with a second radar transmitter. The second instance of the radar waveform may be offset from the first instance of the radar waveform by the offset value. The offset value may be a time offset, a frequency offset, or a combination including both time and frequency offsets. UE 115-a may identify at least one object based on transmitting the first instance of the radar waveform, the second instance of the radar waveform, or both. In some cases, UE 115-a may filter our interference between the first instance of the radar waveform and the second instance of the radar waveform based on the offset.

Figure 2A:
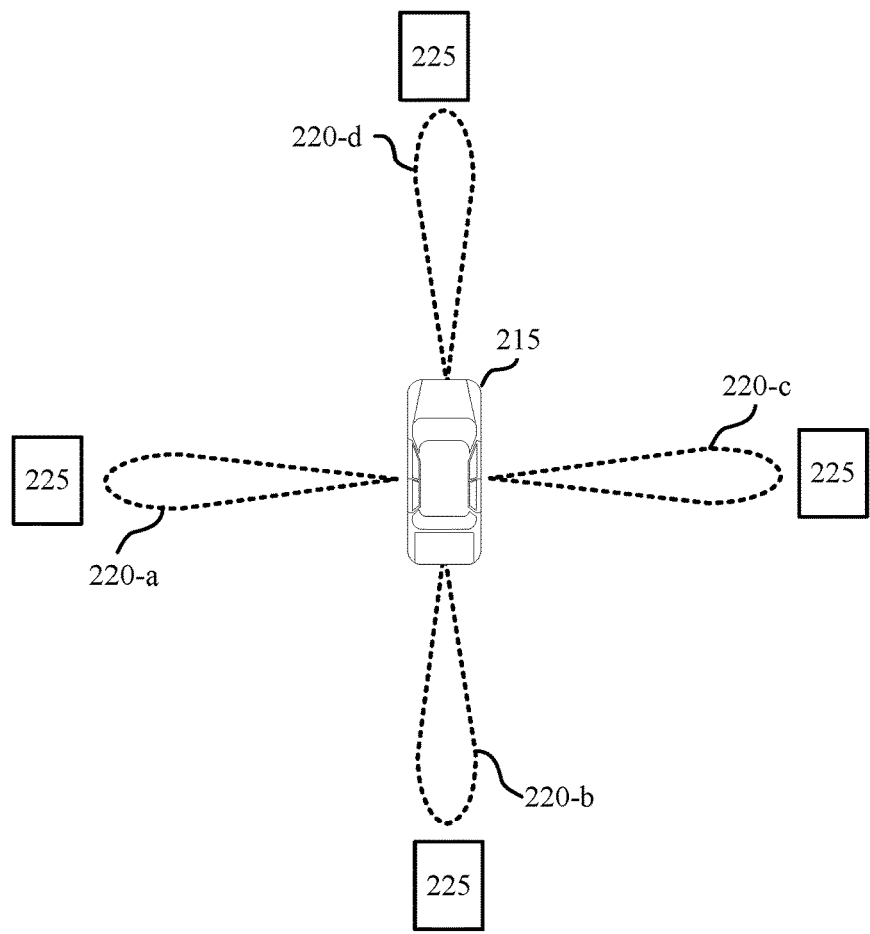
FIG. 2A illustrates an example of a wireless communications system that supports radar interference mitigation in accordance with aspects of the present disclosure.

FIG. 2A illustrates an example of a wireless communications system 200 that supports radar interference mitigation in accordance with aspects of the present disclosure. In some examples, wireless communications system 200 may implement aspects of wireless communications system 100. UE 215 may be a vehicle, and may be an example of UEs 115 described with reference to FIG. 1.

In some examples, one or more UEs (e.g., wireless devices or vehicles) may utilize radar signaling for a variety of applications. For instance, UE 215 may utilize multiple radar transmitters, radar receivers, radar transceivers, or the like, to identify one or more objects 225. Objects 225 may include pedestrians, vehicles (including on-road vehicles such as cars and trucks, off-road vehicles such as all-terrain vehicles, bicycles, or the like), traffic, accidents, obstacles in a road or along a route, or the like.

UE 215 may transmit one or more radar waveforms 220 in one or more directions to identify objects 225 in multiple directions. UE 215 may include one or more radar transmitters, radar receivers, radar transceivers, or the like, as described in greater detail with reference to FIG. 3. For instance, UE 215 may have a first radar transceiver mounted on the front of the car (e.g., the hood or bumper of the vehicle), a second radar transceiver mounted on the rear of the car (e.g., on the trunk or bumper of the vehicle), a third radar transceiver mounted on a side of UE 215 (e.g., on, above, or beneath the driver-side door of the vehicle), and a fourth radar transmitter mounted on the other side of UE 215 (e.g., on, above, or beneath the passenger-side door). UE 215 may transmit, via the four radar transceivers, radar waveform 220-a, radar waveform 220-b, radar waveform 220-c, and radar waveform 220-d. UE 215 may identify and range objects 225 based on transmitting and receiving the waveforms 220, and may increase safety for UE 215, avoid accidents or collisions, identify potential threats, take responsive action to identified threats, or the like. Use of radar in safety and sweeping protocols may be effective, low-cost, and may be widely available.

Radar signaling may include transmitting frequency modulated continuous wave (FMCW) waveforms. Radar waveforms may be defined by one or more waveform parameters. For instance, a waveform may be defined by a set of chirps or bursts, a frequency range, a sweeping direction across the frequency range, a speed of sweeping, or the like.

Ranging procedures described herein may include transmitting, by a radar a transmitter of UE 215, an electromagnetic pulse, and monitoring for the electromagnetic pulse to reflect back. UE 215 may then compare the received electromagnetic pulse to the transmitted electrometric pulse. The delay between transmitting the electromagnetic pulse and receiving the electromagnetic pulse may be used to identify a distance (e.g., range) to an object 225 from which the transmitted electromagnetic pulse reflected.

UE 215 may experience interference generated by another instance of the same radar waveform. For instance, radar waveform 220-a may generate a lobe pointed in the same direction as radar waveform 220-c. Radar waveform 220-a may thus generate interference received by the radar transceiver transmitting and receiving radar waveform 220-c. Thus, because UE 215 utilizes multiple radars or radar transceivers located in close proximity to each other, and because radar signaling may experience low propagation loss, shielding or antenna gain outside a radar field of view may generate interference. That is, UE 215 may transmit multiple instance of a same radar waveform, which may interfere with each other, as described in greater detail with reference to FIG. 2A and FIG. 2B.

As described in greater detail with reference to FIG. 2A, UE 215 may transmit one or more radar waveforms 220. For instance, UE 215 may transmit radar waveform 220-d forward, and radar waveform 220-b backward. However, radar waveform 220-b may interfere with radar waveform 220-d (e.g., and vice versa).

In some examples, as described in greater detail with reference to FIG. 4, UE 215 may identify a radar configuration including a radar waveform 220, and may transmit instances of the same radar waveform 220 in different directions. UE 215 may identify a frequency offset between transmitted radar waveform 220-d and received radar waveform 220-d. For instance, UE 215 may generate and transmit radar waveform 220-d defined as x over time (t) (e.g., $x(t)=e^{j\beta t^2}$). UE 215 may then monitor for radar waveform 220-d, and may identify a received waveform 220-d defined as y over time (t), which may be equal to x(t) but offset in time by $\tau$ (e.g., $y(t)=x(t-\tau)=e^{j\beta(t-\tau)^2}$). Having obtained both the transmitted radar waveform x(t) and the received radar waveform y(t), UE 215 may use to perform a multiplying operation and obtain sinusoidal wave $y(t)*x(t)=e^{-j2\pi\beta\tau t}e^{j\beta\tau^2}$. The resulting sinusoidal wave may be plotted on range spectrum 201 or range spectrum 202, which may be used to isolate a beat frequency $f_b$. That is, the frequency offset between transmitted radar waveform 220-d and the received radar waveform 220-d may be referred to as $f_b$. The value of $f_b$ may be directly proportional to the time offset between the transmitted radar waveform 220-d and the received radar waveform 220-d, and may therefore be utilized by UE 215 to determine a range (e.g., distance) between UE 215 and an object 225.

Figure 2B:
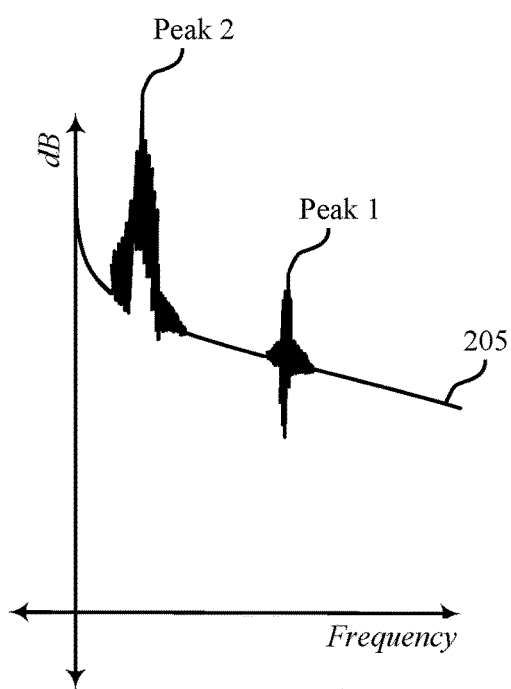
FIG. 2B illustrates an example of a range spectrum that that supports radar interference mitigation in accordance with aspects of the present disclosure.

FIG. 2B illustrates an example of a range spectrum 201. Range spectrum 201 may include curve 205, which may represent the mixed combination of a transmitted waveform and a received waveform. Where radar waveform 220-d and radar waveform 220-b are identical or similar waveforms, $f_b$ of an identified object may appear as peak 1 on curve 205, for example as detected at a receiver of a radar device of UE 215 that transmitted radar waveform 220-d.

In some examples (e.g., where radar waveform 220-d and radar waveform 220-b are identical or similar), interference from another radar waveform (e.g., radar waveform 220-b) may generate the appearance of a ghost object (e.g., another $f_b$ value that appears as another peak indicating the presence of an object that does not actually exist) at UE 215. For instance, UE 215 may transmit radar waveform 220-d and may monitor for a reflection of radar waveform 220-d. However, UE 215 may also transmit (e.g., simultaneously or during a same time window) radar waveform 220-b. Radar waveform 220-b may be another instance of radar waveform 220-d transmitted in a different direction. UE 215 may receive a transmission of radar waveform 220-b at a receiver of the radar device that transmitted radar waveform 220-d, and may incorrectly interpret the received radar waveform 220-b as a reflection of radar waveform 220-d. This may result in peak 2. In such examples, UE 215 may falsely interpret the location of an object 225 based on the location of peak 2 (instead of based on the location of peak 1).

Additionally, UE 215 may be capable of tracking movement or direction of an object 225 over time (e.g., based on the location of peak 1 over time (and the $f_b$ values based thereon). However, based on the location of peak 2, UE 215 may incorrectly determine a movement or direction of an object 225. For instance, UE 215 may interpret peak 1 and peak 2 as an indication that a stationary object 225 is moving, or is at an incorrect location. Thus, intra-vehicle interference from another radar transmitter of UE 215 may result in failing to identify an object 225, failing to identify the location of an object 225, incorrectly interpreting interference as a false or ghost object 225 that does not actually exist, incorrectly interpreting movement of an object 225, or the like. Any of these errors may result in decreased safety, unnecessary or inefficient safety measures (e.g., deployed in response to a detected ghost object that is not in fact present), failure to take safety measures, collisions, or the like.

Figure 2C:
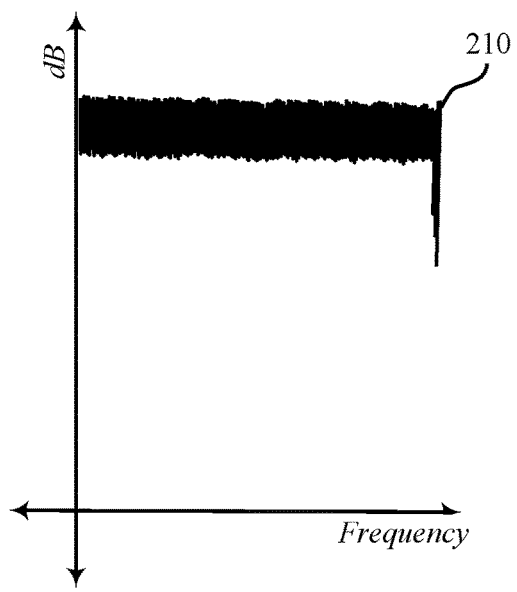
FIG. 2C illustrates an example of a range spectrum that that supports radar interference mitigation in accordance with aspects of the present disclosure.

FIG. 2C illustrates an example of a range spectrum 202. Range spectrum 202 may include curve 210, which may represent the mixed combination of a transmitted waveform and a received waveform. In some cases, $f_b$ of an identified object may appear as a peak on curve 210.

In some examples (e.g., where radar waveform 220-d is different than waveform 220-b), interference from another radar waveform (e.g., radar waveform 220-b) may cover or obscure the location of a $f_b$ value. For instance, radar waveform 220-d may be a sawtooth waveform (e.g., may sweep upward across frequency over time, and may then sweep downward across frequency over time). Radar waveform 220-b may also be a sawtooth waveform but may be reversed or offset in time from radar waveform 220-b (e.g., radar waveform 220-b may sweep down across frequency during part or all of a time interval during which radar waveform 220-d sweeps up across frequency, and vice versa). In such examples, interference from radar waveform 220-d in combination with radar waveform 220-d may result in curve 210. Curve 210 may obscure the location of any peaks, and UE 215 may therefore be unable to determine a $f_b$ value for radar waveform 220-c. In such examples, UE 215 may not be able to identify the existence, location, or movement of an object 225, which may result in failed object detection, decreased safety, collisions, or the like.

In some examples, UE 215 may transmit instance of a waveform 220 at a time offset, a frequency offset, or both, to filter out ghost objects and improve object detection and safety procedures, as described with reference to FIGS. 5-7.

In some examples, UE 215 may transmit and receive radar waveforms using one or more radar transmitters, radar transceivers, radar receivers, or the like, as described in greater detail with reference to FIG. 3.

Figure 3:
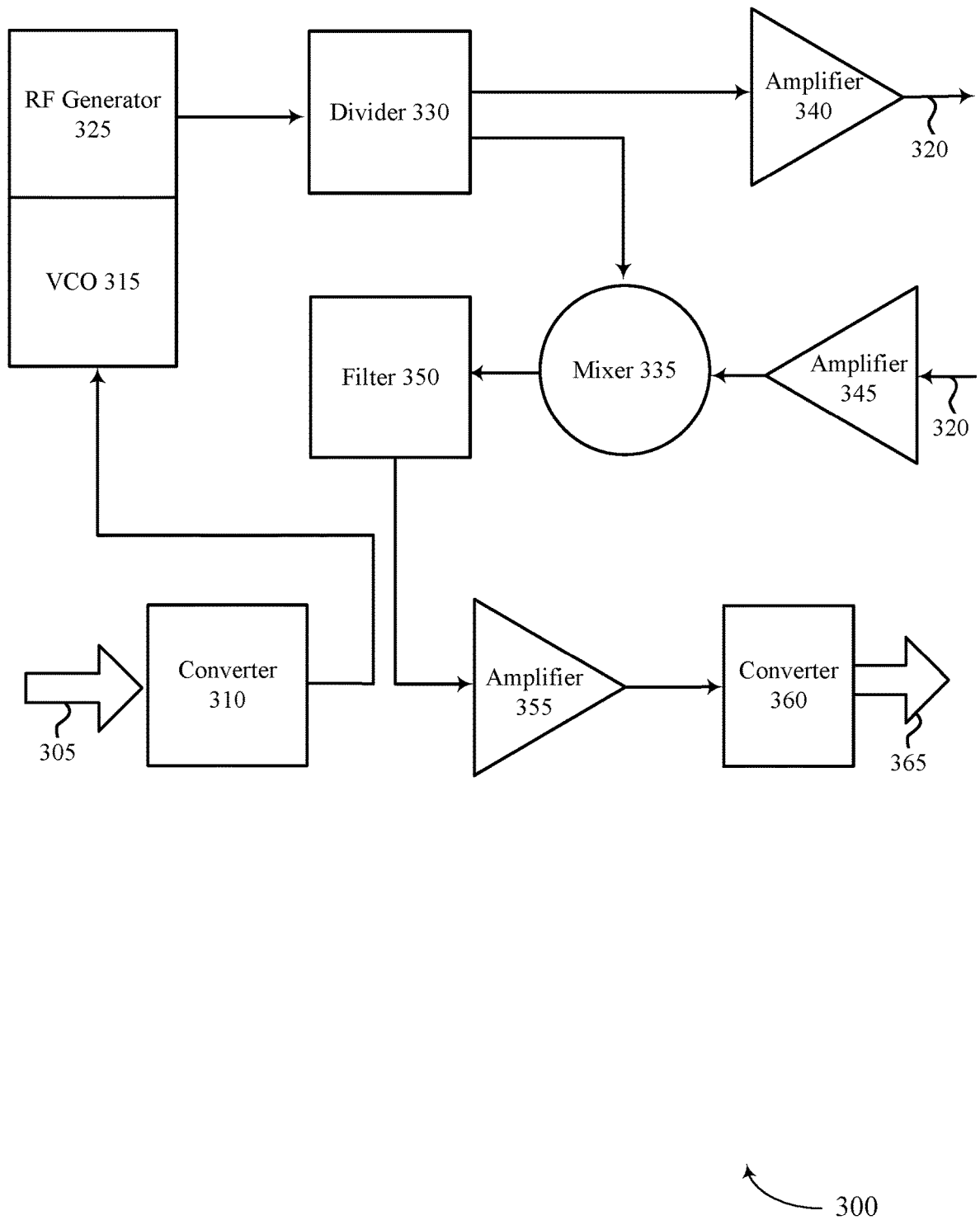
FIG. 3 illustrates an example of a device diagram that supports radar interference mitigation in accordance with aspects of the present disclosure.

FIG. 3 illustrates an example of a device diagram 300 that supports radar interference mitigation in accordance with aspects of the present disclosure. In some examples, device diagram 300 may implement aspects of wireless communications system 100. Device diagram 300 may be a part of a UE 215 as described with reference to FIG. 2.

A UE 215 (e.g., a vehicle) may include one or more radar transceivers (e.g., a single unit or receiver and a transmitter). UE 215 may control radar operations via a single control unit, or multiple control units. A control unit may include, for instance, converter 310, amplifier 355, and converter 360.

Converter 310 (e.g., a digital to analog converter) may receive an input 305. Input 305 may be a digital radar waveform from a processor (e.g., a processor 1140 as further described herein), which may be defined or controlled by a radar waveform configuration. The digital radar waveform (corresponding to the radar waveform 320 to be transmitted) may be defined by one or more parameters, including one or more chirps, frequency range, frequency sweeping direction, periodicity, shape, etc., as described in greater detail with reference to FIG. 4. Converter 310 may convert input 305 into an analog signal.

Voltage controlled oscillator (VCO) 315 and RF generator 325 may generate frequencies for transmitting radar waveform 320 based on the analog signal received from converter 310. VCO 315 and RF generator 325 may thus generate the radar waveform to be transmitted as radar waveform 320.

Divider 330 (e.g., a power divider) may input the generated radar waveform 320 to mixer 335. Amplifier 340 may amplify the radar waveform received from the output of divider 330 for transmission as radar waveform 320 by one or more antennas.

Amplifier 345 may amplify received radar waveform 320 (e.g., a reflection of transmitted radar waveform 320) for mixing by mixer 335. Mixer 335 may combine or multiply the transmitted radar waveform 320 received from divider 330 and the received radar waveform 320 in order to down-convert the received waveform 320. Mixer 335, filter 350, or both, may isolate a beat frequency value, as described with reference to FIGS. 2A, 2B, and 2C. In some examples, an additional filter may receive output 365 and may perform the filtering described with reference to FIGS. 5-7.

Mixer 335 may down convert the filtered information to the base band, and converter 360 may convert the baseband signal from analog to digital, resulting in output 365. In some examples, output 365 may be a digital radar waveform to a processor, which may be the same or different processor than the processor that sent input 305 (e.g., a processor 1140 as further described herein). In some examples, output 365 may be utilized to identify a beat frequency value, as described with reference to FIGS. 2A, 2B, and 2C. In some examples, as described with reference to FIGS. 5-7, a UE 215 may transmit instances of radar waveforms 320 at different times, different frequencies, or both, to avoid interference and filter out ghost objects. Radar waveforms 320 are described in greater detail with reference to FIG. 4.

Figure 4:
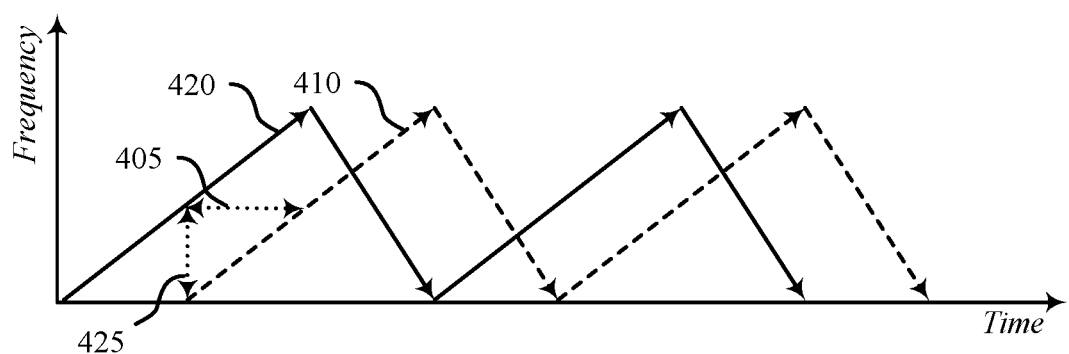
FIG. 4 illustrates an example of a waveform configuration that supports radar interference mitigation in accordance with aspects of the present disclosure.

FIG. 4 illustrates an example of a waveform configuration 400 that supports radar interference mitigation in accordance with aspects of the present disclosure. FIG. 4 is not necessarily shown to scale to allow for clearer illustration and description; time and/or frequency durations may be relatively shorter (or longer) than shown. In some examples, waveform configuration 400 may implement aspects of wireless communications system 100. For instance, a UE 215 may transmit one or more waveforms according to waveform configuration 400, as described with reference to FIGS. 1-3.

A UE 215 (e.g., a vehicle) may support radar sensing by transmitting a radar waveform 420 and detecting a reflected radar waveform 410. The radar waveform 420 may be, for example, an FMCW waveform. In some cases, the radar waveform 420 may be defined by one or more parameters, which may include a radar chirp, frequency range, sweeping direction, sweeping rate, sweeping timing, or the like. A single chirp of radar waveform 420 may include sweeping in frequency (e.g., starting at a low frequency and increasing in frequency over time). For instance, a chirp of radar waveform 420 may sweep up from a first frequency (e.g., about 76 GHz, though other frequencies may be used, for example other mmW frequencies) to a higher frequency (e.g., about 77 GHz, though other frequencies, and ranges from the first frequency, may be used, for example other mmW frequencies) over a first time period, and may then sweep back down from the higher frequency to the first frequency over a second time period. The first and second time period may be the equal, the first time period may be longer than the second time period, or the second time period may be longer than the first time period. In some cases, UE 215 may transmit multiple consecutive chirps for the radar waveform 420. For example, once one chirp completes a frequency sweep (e.g., just up, or up and down, or just down), the UE 215 may transmit a second chirp.

UE 215 may receive a reflected chirp after a delay 405. For example, the radar waveform 420 may be reflected off an object, such as another UE, a stationary object, another vehicle, or the like. The reflected radar waveform 410 may, in some cases, have a same waveform as the radar waveform 420. The delay may correspond to a propagation delay between UE 215 transmitting the radar waveform 420, the radar sensing signal reflecting off of the object, and the reflected radar waveform 410 travelling back to UE 215.

To determine the propagation delay, UE 215 may determine a frequency difference between the radar waveform 420 and the reflected radar waveform 410. For example, UE 215 may determine a beat frequency 425 between the radar waveform 420 and the reflected radar waveform 410. The beat frequency 425 may be proportional to the delay and therefore the distance between UE 215 and the reflecting object. The beat frequency 425 may be an output of mixing the radar waveform 420 and the reflected radar waveform 410.

UE 215 may also determine direction or velocity information based on transmitting multiple chirps. For example, UE 215 may identify a target's velocity based on a doppler spectrum of the multiple reflected chirps in the reflected radar waveform 410. Additionally, or alternatively, UE 215 may identify a target direction on a direction of arrival of the reflected radar waveform 410. For example, a device receiving an FMCW waveform may determine a range spectrum of the transmitting device.

To reduce the likelihood of interference, UE 215 may transmit the radar waveform 420 from one radar transmitter at a first time and initiate the sweeping of a chirp at a first frequency. In some examples, UE 215 may transmit another instance of the radar waveform 420 at an offset from the first time, from the second frequency, or both.

Figure 5:
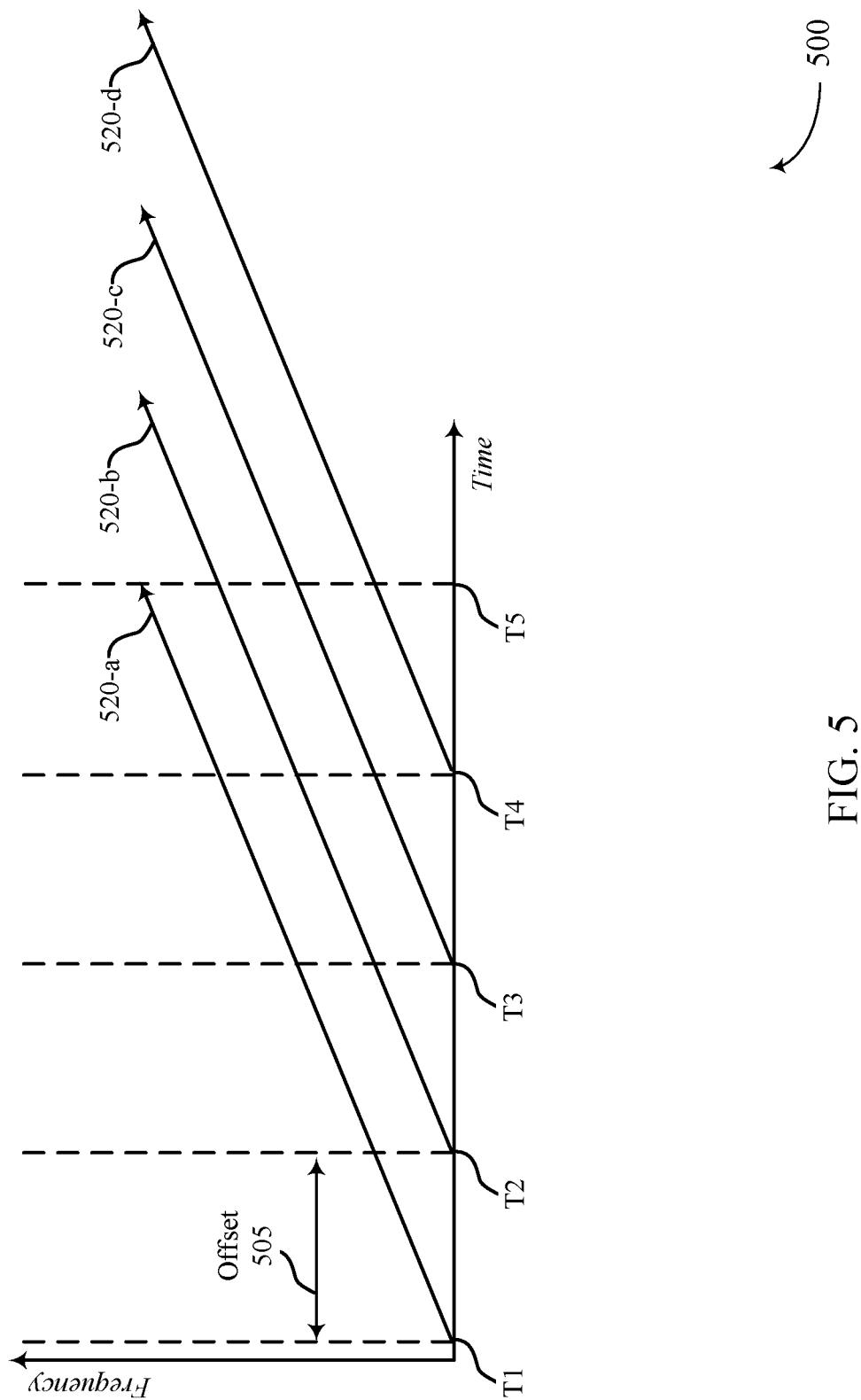
FIG. 5 illustrates an example of a waveform transmission scheme that supports radar interference mitigation in accordance with aspects of the present disclosure.

FIG. 5 illustrates an example of a waveform transmission scheme 500 that supports radar interference mitigation in accordance with aspects of the present disclosure. FIG. 5 is not necessarily shown to scale to allow for clearer illustration and description; time and/or frequency durations may be relatively shorter (or longer) than shown. In some examples, waveform transmission scheme 500 may implement aspects of wireless communications system 100. For instance, a UE 215 may implement waveform transmission scheme 500, as described with reference to FIGS. 1-4.

In some examples, UE 215 may transmit one or more instances of a radar waveform 520 at an offset. The offset may be a time offset 505 (an offset in time). Radar waveform 520 may be defined by a configuration including a set of radar waveform chirps, a radar waveform carrier frequency range, a radar waveform frequency sweeping direction, a radar waveform frequency sweeping rate, or any combination thereof. For example, UE 215 may transmit a first instance of radar waveform 520 (e.g., radar waveform 520-*a* at time T1) in a first direction. After time offset 505 (e.g., at time T2), UE 215 may transmit a second instance of radar waveform 520 (e.g., radar waveform 520-*b*) in a second direction. At time T3 (e.g., after time offset 505 between T2 and T3), UE 215 may transmit another instance of radar waveform 520 (radar waveform 520-*c*) in a third direction and at time T4 UE 215 may transmit another instance of radar waveform 520 (e.g., radar waveform 520-*d*) in a fourth direction. In some examples, each instance of radar waveform 520 may have the same set of chirps, the same carrier frequency, the same sweeping direction, the same sweeping rate, etc.

Time offset 505 may be defined as $n\Delta T$ where n is an integer and $\Delta T$ represents a time value (e.g., a time delay between transmission and reception of an instance of radar waveform 520). Interference between instances of radar waveform 520 may be located outside of a filtered range or range of interest. That is, based on ranging procedures described with reference to FIGS. 2A-4, UE 215 may identify objects located at a range of $$\frac{n\Delta Tc}{2}$$

where c represents the speed of light. If UE 215 sets the value of the offset such that $$\frac{n\Delta Tc}{2} > R_{max},$$

where $R_{max}$ represents a maximum range value, then ghost objects generated by interference may be filtered out. $R_{max}$ may be defined as a range that is outside of a filtered range or a range of interest. For instance, UE 215 may perform ranging procedures to identify objects within a range of interest (e.g., up to 350 meters, though other ranges may be used consistent with this disclosure). Time offset 505 may be defined such that $$\frac{n\Delta Tc}{2} > 350$$

(e.g., 450 meters, though other values may be used consistent with this disclosure). In such examples, although radar waveform 520-*b* may cause interference resulting in a ghost object located beyond $R_{max}$, (e.g., equivalent to about 450 meters from UE 215), UE 215 may only consider objects located inside of (less than) $R_{max}$ (e.g. objects up to 350 meters away), and thus may filter out ghost objects located outside of $R_{max}$.

In some examples, UE 215 may apply a time offset 505 that is defined such that some overlap exists between all (or a set of) instances of radar waveform 520. For instance, for four instances of radar waveform 520 (e.g., transmitted respectively from the front, back, right side, and left side of the vehicle), UE 215 may ensure that that first instance of radar waveform 520 (e.g., radar waveform 520-*a*) overlaps at least partially (e.g., for part or all of the time period between T4 and T5) with the fourth instance of radar waveform 520 (e.g., radar waveform 520-*d*). AT time T5, UE 215 may transmit another instance of radar waveform 520 from the same transmitter that transmitted the first instance of radar waveform 520 (e.g., radar waveform 520-*a*).

The value of time offset 505 may be determined autonomously by UE 215, or may be standardized, preconfigured, input by a user, or indicated by other devices or vehicles.

In some examples, UE 215 may apply an offset in frequency, as described with reference to FIG. 6.

Figure 6:
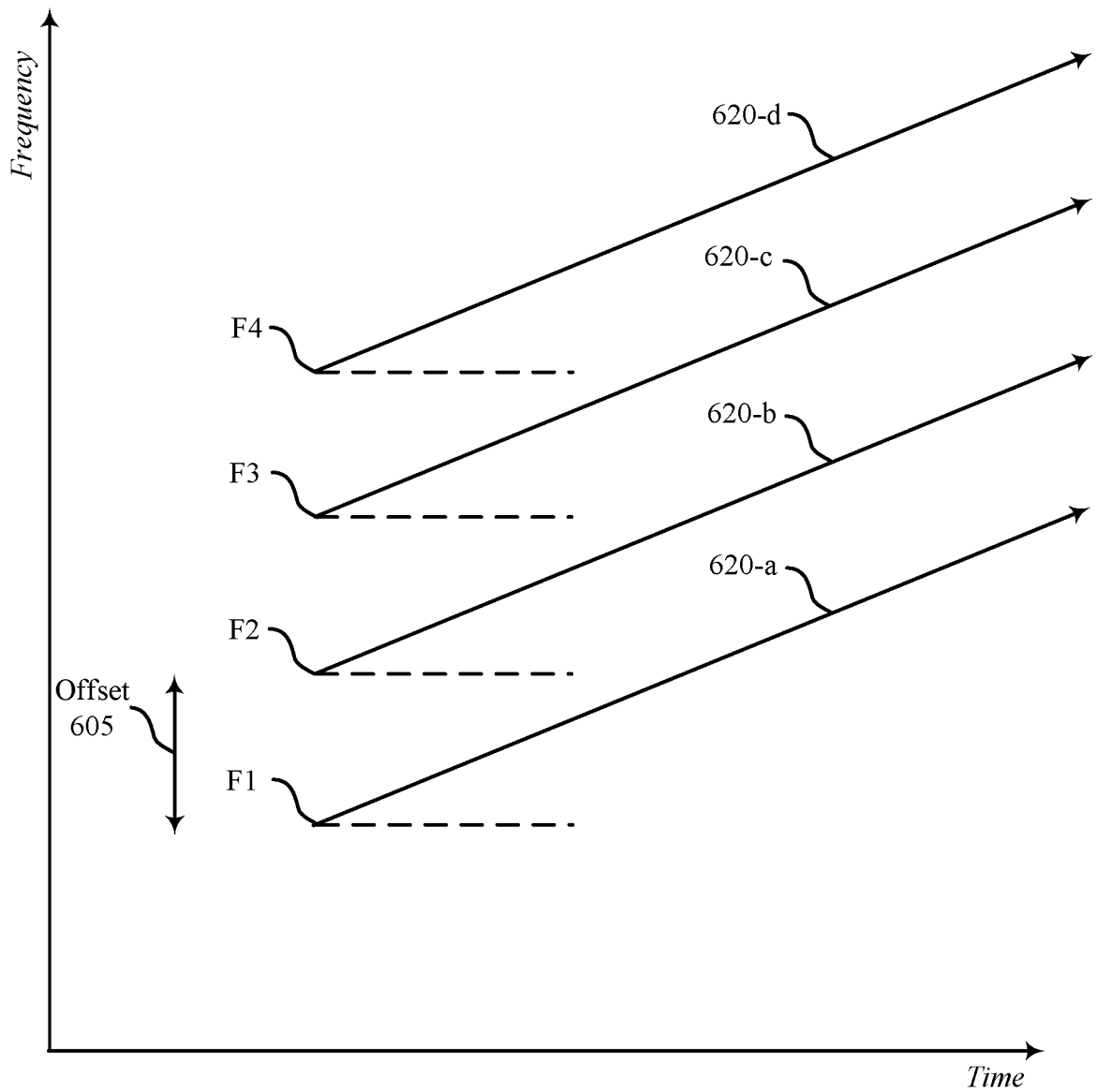
FIG. 6 illustrates an example of a waveform transmission scheme that supports radar interference mitigation in accordance with aspects of the present disclosure.

FIG. 6 illustrates an example of a waveform transmission scheme 600 that supports radar interference mitigation in accordance with aspects of the present disclosure. FIG. 6 is not necessarily shown to scale to allow for clearer illustration and description; time and/or frequency durations may be relatively shorter (or longer) than shown. In some examples, waveform transmission scheme 600 may implement aspects of wireless communications system 100. For instance, a UE 215 may implement waveform transmission scheme 500, as described with reference to FIGS. 1-5.

In some examples, UE 215 may transmit one or more instances of a radar waveform 620 at an offset. The offset may be a frequency offset 605 (an offset in frequency). Radar waveform 620 may be defined by a configuration including a set of radar waveform chirps, a radar waveform carrier frequency range, a radar waveform frequency sweeping direction, a radar waveform frequency sweeping rate, or any combination thereof. For example, UE 215 may transmit a first instance of radar waveform 620 (e.g., radar waveform 620-*a* at frequency F1) in a first direction. At frequency offset 605 (e.g., at frequency F2), UE 215 may transmit a second instance of radar waveform 620 (e.g., radar waveform 620-*b*) in a second direction. At F3 (e.g., at frequency offset 605 between F2 and F3), UE 215 may transmit another instance of radar waveform 620 (radar waveform 620-*c*) in a third direction and at frequency F4 UE 215 may transmit another instance of radar waveform 620 (e.g., radar waveform 620-*d*) in a fourth direction. In some examples, each instance of radar waveform 620 may have the same set of chirps, the same sweeping direction, the same sweeping rate, may be transmitted at the same time, etc.

Frequency offset 605 may be defined as nΔf where n is an integer and Δf represents a frequency value. Interference between instances of radar waveform 620 may be located outside of a filtered range or range of interest. That is, based on ranging procedures described with reference to FIGS. 2A-4, UE 215 may identify objects located at a range of $$\frac{n\Delta fc}{2\beta}$$

where c represents me speed of light. If UE 215 sets the value of the offset such that $$\frac{n\Delta fc}{2\beta} > R_{max},$$

where $R_{max}$ represents a maximum range value, then ghost objects generated by interference may be filtered out. $R_{max}$ may be defined as a range that is outside of a filtered range or a range of interest. For instance, UE 215 may perform ranging procedures to identify objects within a range of interest (e.g., up to 350 meters, though other ranges may be used consistent with this disclosure). Frequency offset 605 may be defined such that $$\frac{n\Delta Tc}{2} > 350$$

(e.g., 450 meters, though other values may be used consistent with this disclosure). In such examples, although radar waveform 620-*b* may cause interference resulting in a ghost object located 450 meters from UE 215, UE 215 may only consider objects located beyond $R_{max}$ (e.g., equivalent to about up to 350 meters away), and thus may filter out ghost objects located outside of $R_{max}$.

In some examples, UE 215 may apply a frequency offset 605 that is defined such available frequency ranges for the configured sweeping of radar waveform 620 is divided evenly between the instances of radar waveform 620. In other examples, the frequency offsets may be unevenly divided. The value of frequency offset 605 may be determined autonomously by UE 215, or may be standardized, preconfigured, input by a user, or indicated by other devices or vehicles.

In some examples, UE 215 may apply an offset in frequency and time, as described with reference to FIG. 7.

Figure 7:
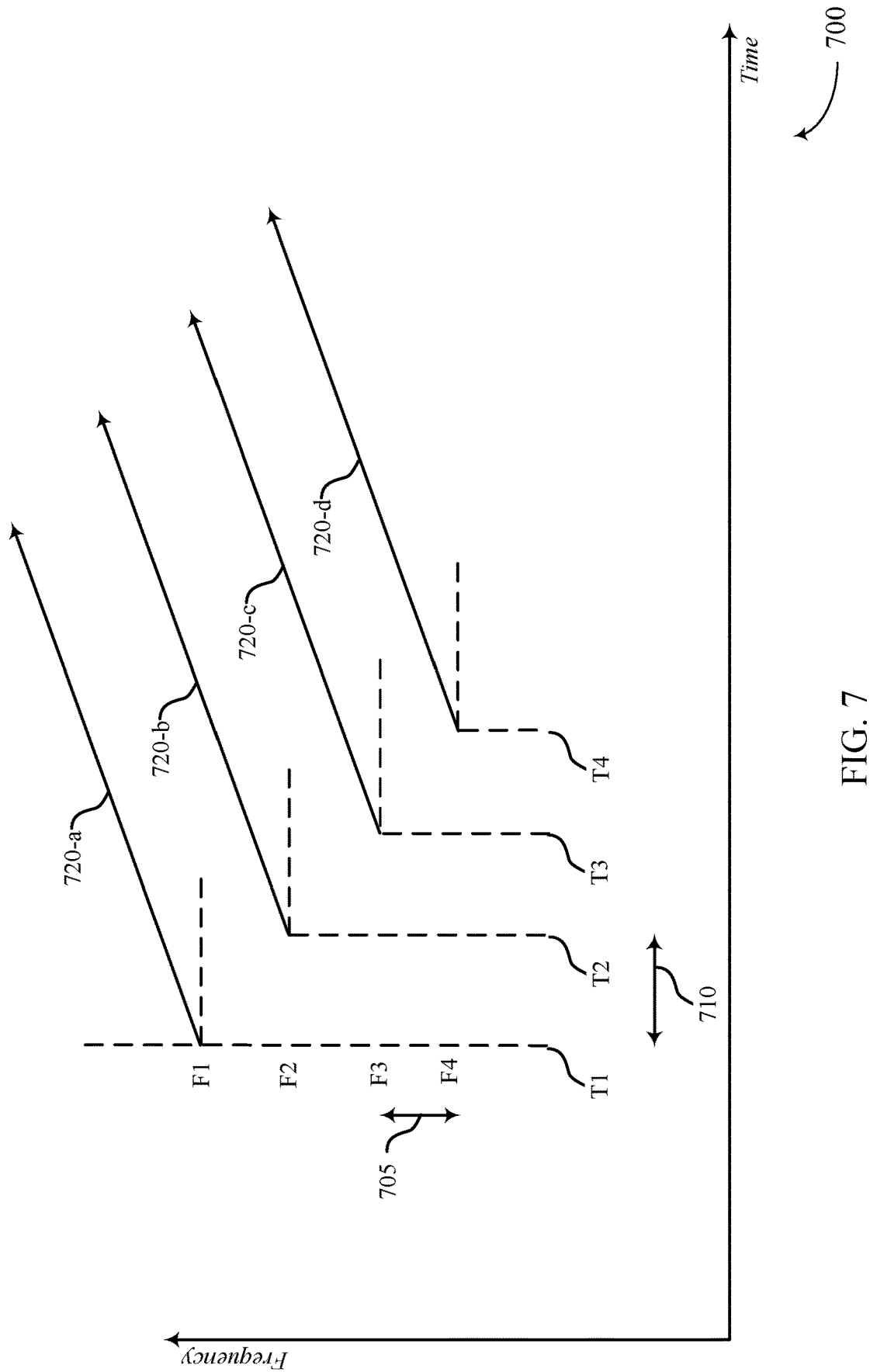
FIG. 7 illustrates an example of a waveform transmission scheme that supports radar interference mitigation in accordance with aspects of the present disclosure.

FIG. 7 illustrates an example of a waveform transmission scheme 700 that supports radar interference mitigation in accordance with aspects of the present disclosure. FIG. 7 is not necessarily shown to scale to allow for clearer illustration and description; time and/or frequency durations may be relatively shorter (or longer) than shown. In some examples, waveform transmission scheme 700 may implement aspects of wireless communications system 100. For instance, a UE 215 may implement waveform transmission scheme 500, as described with reference to FIGS. 1-6.

In some examples, UE 215 may transmit one or more instances of a radar waveform 720 at an offset. The offset may include both a frequency offset 705 (an offset in frequency) and time offset 710 (an offset in time). Radar waveform 720 may be defined by a configuration including a set of radar waveform chirps, a radar waveform frequency sweeping direction, a radar waveform frequency sweeping rate, or any combination thereof. For example, UE 215 may transmit a first instance of radar waveform 720 (e.g., radar waveform 720-*a* at frequency F1 and time T1) in a first direction, a second instance of radar waveform 720 (e.g., radar waveform 720-*b* at frequency F2 and time T2) in a second direction, a third instance of radar waveform 720 (e.g., radar waveform 720-*c* at frequency F3 and time T3 in a third direction, and a fourth instance of radar waveform 720 (e.g., radar waveform 720-*d* at frequency F4 and T4) in a fourth direction. In some examples, each instance of radar waveform 720 may have the same set of chirps, the same sweeping direction, the same sweeping rate, etc.

Frequency offset 705 may be defined as nΔf where n is an integer and Δf represents a frequency value. Time offset 710 may be defined as nΔT where n is an integer and ΔT represents a time value. Interference between instances of radar waveform 720 may be located outside of a filtered range or range of interest. That is, based on ranging procedures described with reference to FIGS. 2A-4, UE 215 may identify objects located at a range of $$\frac{n(\beta\Delta T + \Delta f)c}{2\beta}.$$

If UE 215 sets the value of the offset such that $$\frac{n(\beta\Delta T + \Delta f)c}{2\beta} > R_{max},$$

where $R_{max}$, represents a maximum range value, then ghost objects generated by interference may be filtered out. $R_{max}$ may be defined as a range that is outside of a filtered range or a range of interest. For instance, UE 215 may perform ranging procedures to identify objects within a range of interest (e.g., up to 350 meters, though other ranges may be used consistent with this disclosure). Time offset 710 and frequency offset 705 may be defined such that $$\frac{n(\beta \Delta T + \Delta f)c}{2\beta} > 350 \text{ meters}$$

(e.g., 450 meters, though other ranges may be used consistent with this disclosure). In such examples, although radar waveform 720-b may cause interference resulting in a ghost object located beyond $R_{max}$ (e.g., equivalent to about 450 meters from UE 215), UE 215 may only consider objects located inside of (less than) $R_{max}$ (e.g. objects up to 350 meters away), and thus may filter out ghost objects located outside of $R_{max}$.

Time offset 710, frequency offset 705, or both, may be adjusted. For instance, UE 215 may decrease time offset 710 and increase frequency offset 705, decrease frequency offset 705 and increase time offset 710, decrease both time offset 710 and frequency offset 705, or increase both time offset 710 and frequency offset 705.

Figure 8:
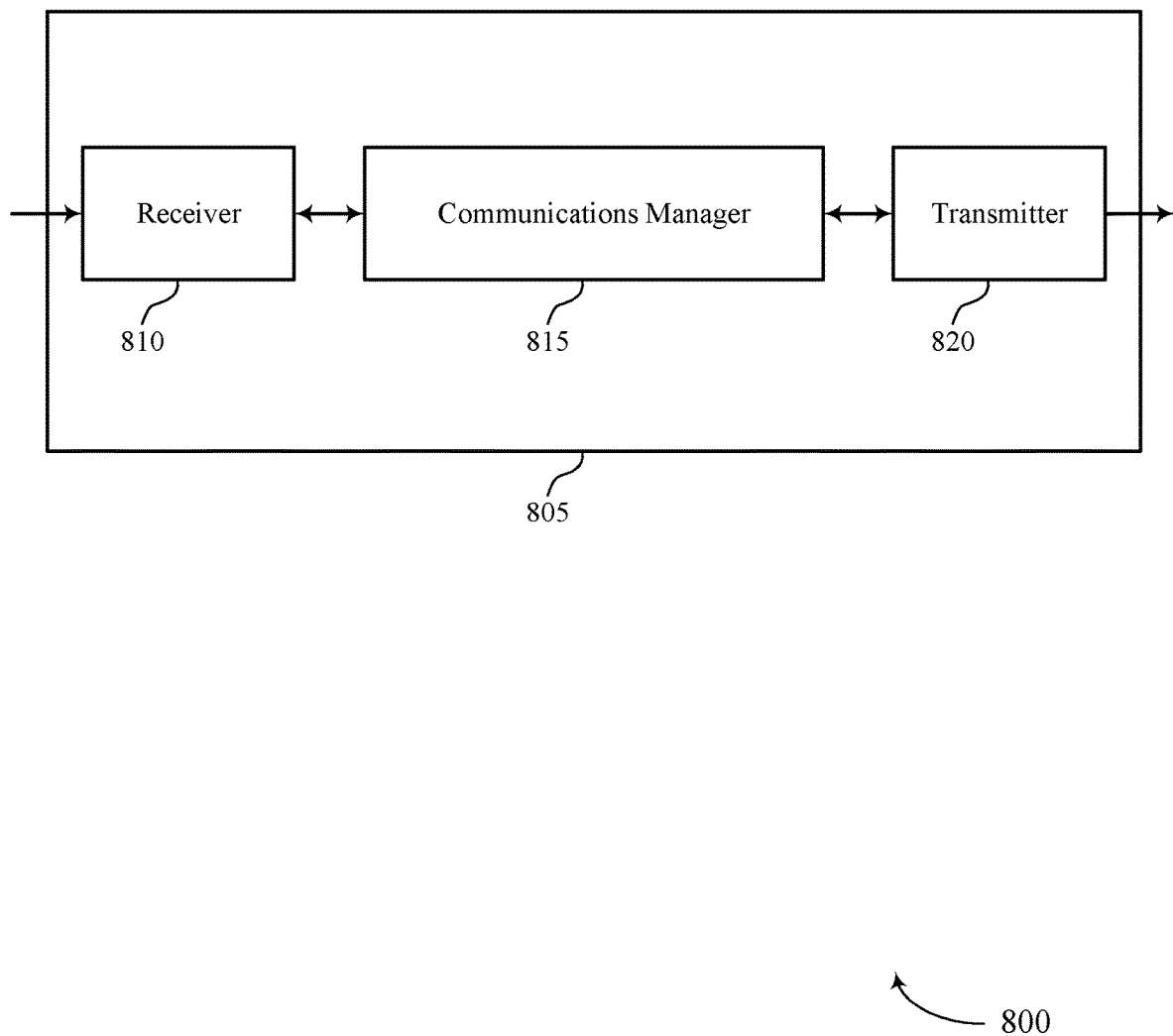
FIGS. 8 and 9 show block diagrams of devices that support radar interference mitigation in accordance with aspects of the present disclosure.

FIG. 8 shows a block diagram 800 of a device 805 that supports radar interference mitigation in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to radar interference mitigation, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may determine a configuration for transmitting a radar waveform by a set of radar transmitters of the vehicle, the configuration indicating an offset value for the radar waveform between a first radar transmitter of the set of radar transmitters and a second radar transmitter of the set of radar transmitters, transmit, by the first radar transmitter, a first instance of the radar waveform, transmit, by the second radar transmitter, a second instance of the radar waveform that is offset from the first instance of the radar waveform by the offset value, and identify at least one object based on transmitting the first instance of the radar waveform, or the second instance of the radar waveform, or both. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

In some examples, the communications manager 815 may be implemented as an integrated circuit or chipset for a mobile device modem, and the receiver 810 and transmitter 820 may be implemented as analog components (e.g., amplifiers, filters, antennas) coupled with the mobile device modem to enable wireless transmission and reception over one or more bands.

The communications manager 815 as described herein may be implemented to realize one or more potential advantages. One implementation may allow the device to increase safety for vehicle occupants, more efficiently utilize computational resources, increase efficiency and speed of adopting safety procedures, decrease power expenditures avoid collisions, or the like.

Figure 11:
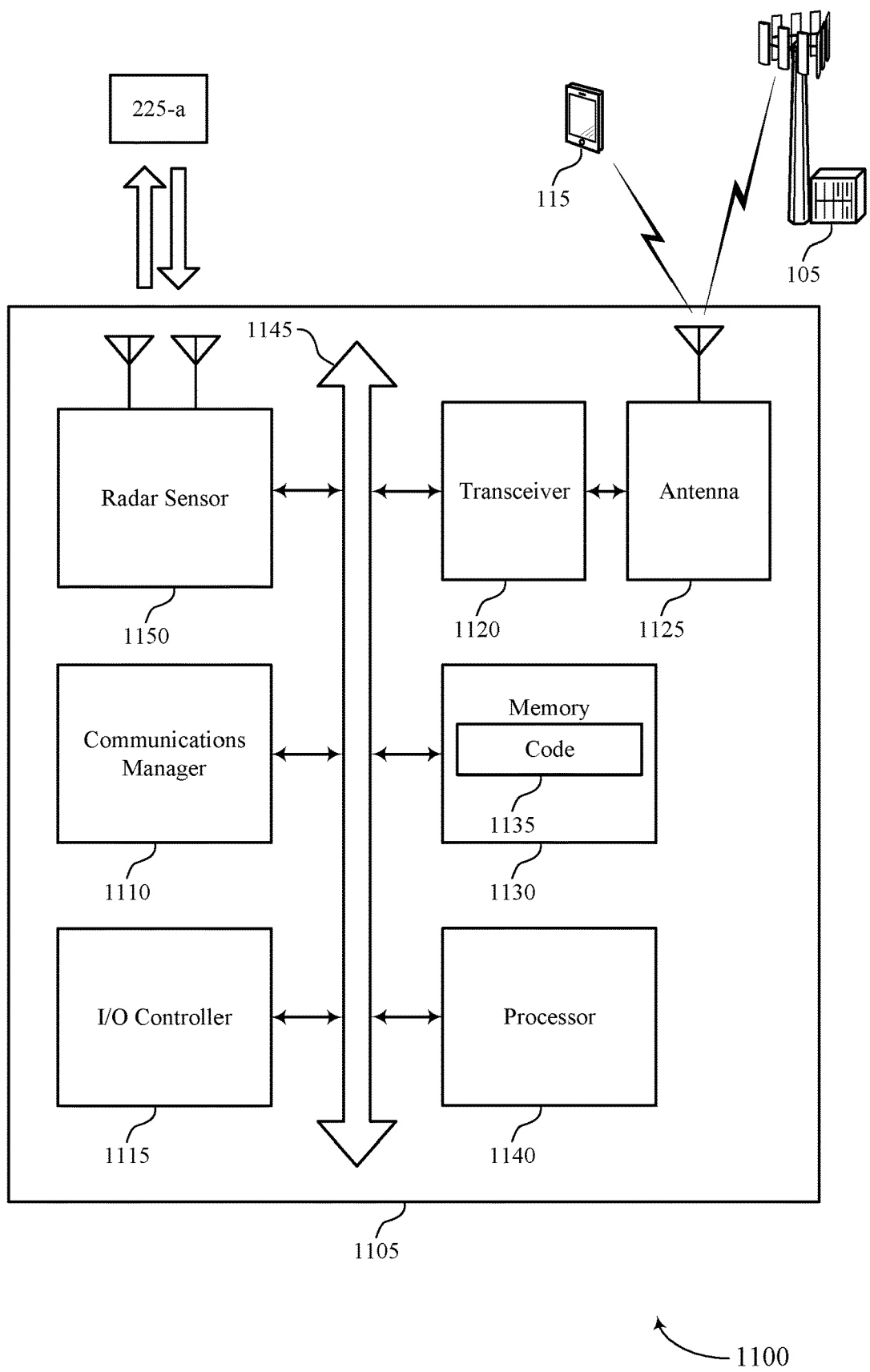
FIG. 11 shows a diagram of a system including a device that supports radar interference mitigation in accordance with aspects of the present disclosure.

Based on techniques for efficiently communicating maximum number of layers for a device as described herein, a processor of a UE 115 (e.g., controlling the receiver 8, the transmitter 820, or a transceiver 1120 as described with respect to FIG. 11) may increase system efficiency and decrease unnecessary processing at a device.

Figure 9:
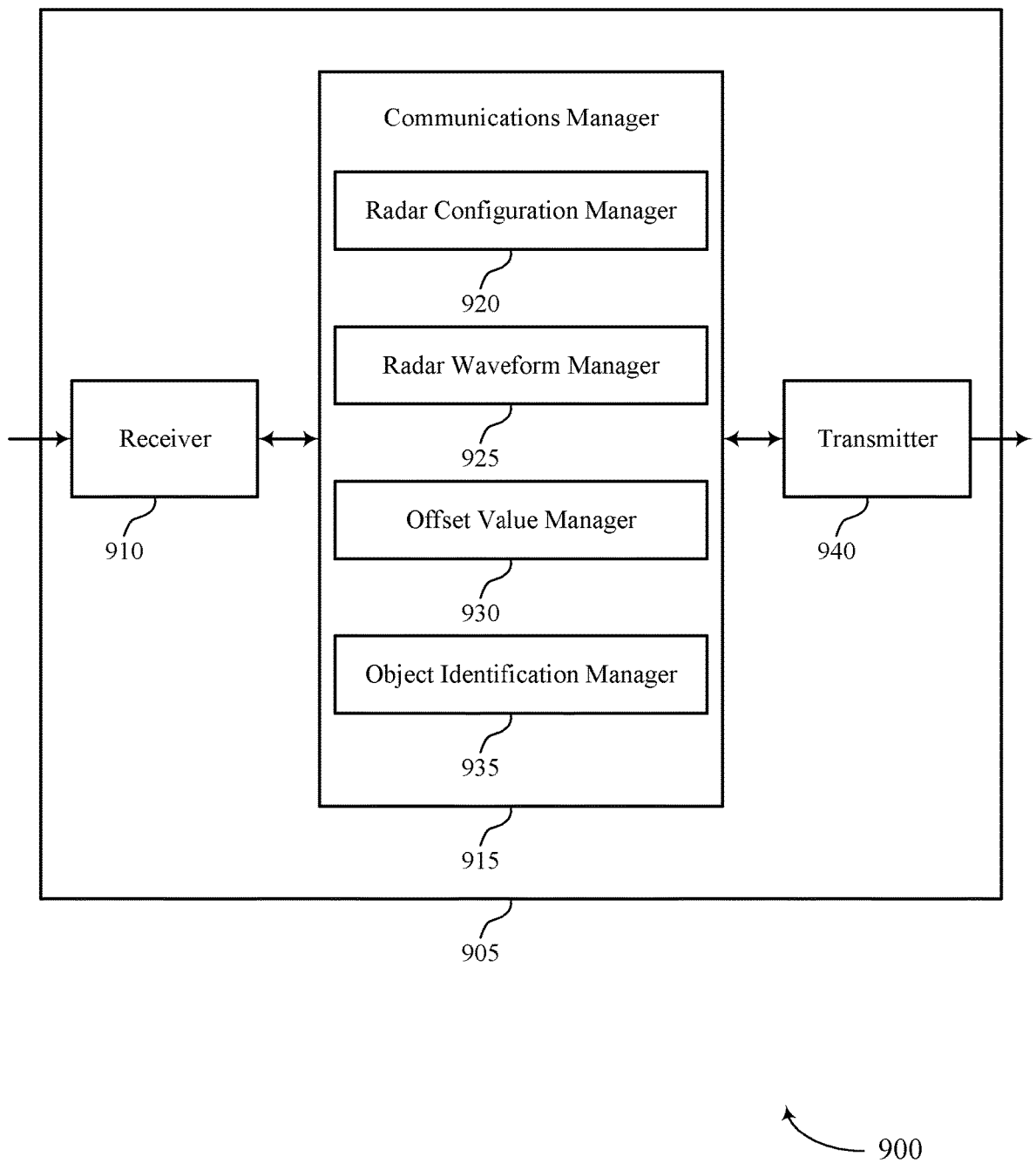

FIG. 9 shows a block diagram 900 of a device 905 that supports radar interference mitigation in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to radar interference mitigation, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a radar configuration manager 920, a radar waveform manager 925, an offset value manager 930, and an object identification manager 935. The communications manager 915 may be an example of aspects of the communications manager 1110 described herein.

The radar configuration manager 920 may determine a configuration for transmitting a radar waveform by a set of radar transmitters of the vehicle, the configuration indicating an offset value for the radar waveform between a first radar transmitter of the set of radar transmitters and a second radar transmitter of the set of radar transmitters.

The radar waveform manager 925 may transmit, by the first radar transmitter, a first instance of the radar waveform.

The offset value manager 930 may transmit, by the second radar transmitter, a second instance of the radar waveform that is offset from the first instance of the radar waveform by the offset value.

The object identification manager 935 may identify at least one object based on transmitting the first instance of the radar waveform, or the second instance of the radar waveform, or both.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
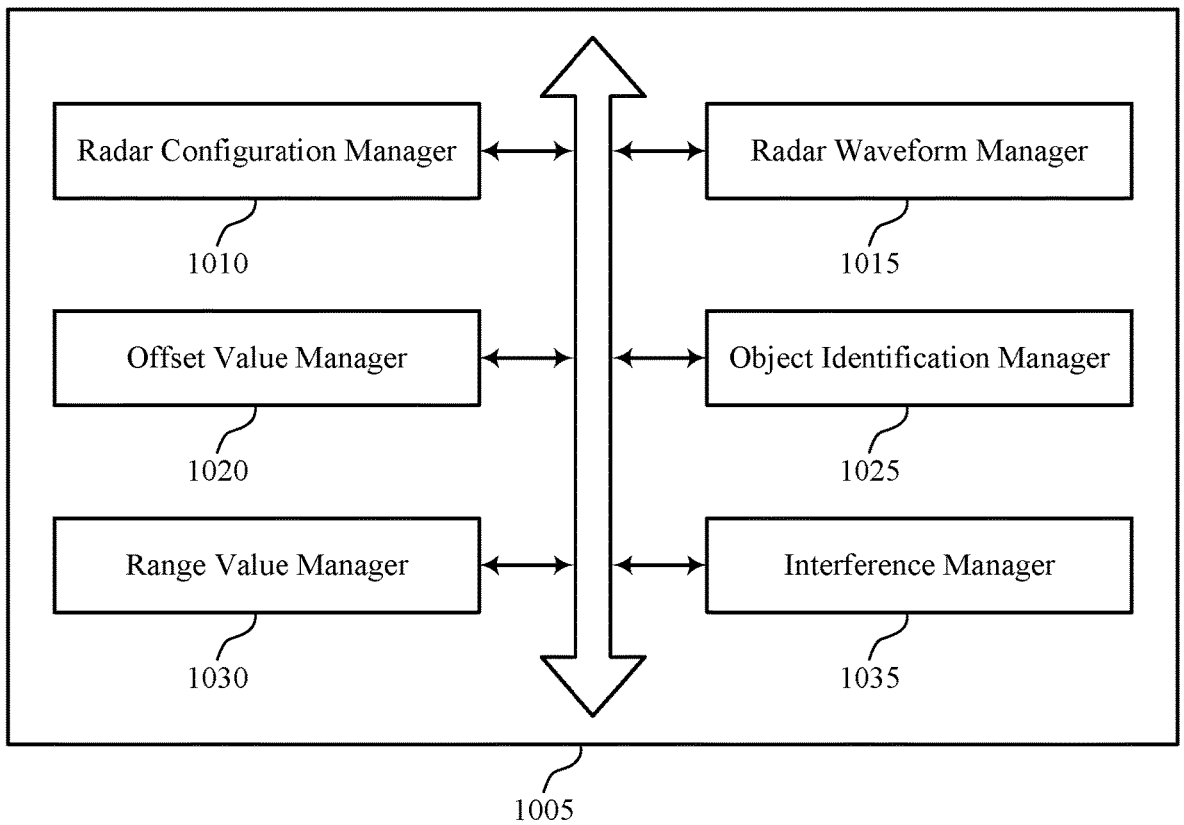
FIG. 10 shows a block diagram of a communications manager that supports radar interference mitigation in accordance with aspects of the present disclosure.

FIG. 10 shows a block diagram 1000 of a communications manager 1005 that supports radar interference mitigation in accordance with aspects of the present disclosure. The communications manager 1005 may be an example of aspects of a communications manager 815, a communications manager 915, or a communications manager 1110 described herein. The communications manager 1005 may include a radar configuration manager 1010, a radar waveform manager 1015, an offset value manager 1020, an object identification manager 1025, a range value manager 1030, and an interference manager 1035. Each of these modules may communicate, directly or indirectly, with one another (e.g., via one or more buses).

The radar configuration manager 1010 may determine a configuration for transmitting a radar waveform by a set of radar transmitters of the vehicle, the configuration indicating an offset value for the radar waveform between a first radar transmitter of the set of radar transmitters and a second radar transmitter of the set of radar transmitters.

In some examples, the radar configuration manager 1010 may transmit, by the fourth radar transmitter, a fourth instance of the radar waveform that is offset from the third instance of the radar waveform by the second offset value.

In some cases, the configuration indicates one or more of a set of radar waveform chirps, a radar waveform carrier frequency range, a radar waveform frequency sweeping direction, a radar waveform frequency sweeping rate, or any combination thereof The radar waveform manager 1015 may transmit, by the first radar transmitter, a first instance of the radar waveform. In some examples, the radar waveform manager 1015 may transmit, by the third radar transmitter, a third instance of the radar waveform. In some cases, the radar waveform includes a frequency modulated continuous wave. In some cases, the frequency modulated continuous wave includes a triangle wave that rises from a first frequency to a second frequency over a first time duration and falls from the second frequency to the first frequency over a second time duration.

The offset value manager 1020 may transmit, by the second radar transmitter, a second instance of the radar waveform that is offset from the first instance of the radar waveform by the offset value. In some examples, the offset value manager 1020 may determine, based on the range value, the offset value. In some cases, the offset value includes a time offset. In some cases, the offset value includes a frequency offset. In some cases, the offset value includes a combination of a time offset and a frequency offset.

The object identification manager 1025 may identify at least one object based on transmitting the first instance of the radar waveform, or the second instance of the radar waveform, or both.

The range value manager 1030 may identify a range value based on a filtering bandwidth value. In some examples, the range value manager 1030 may identify a range to the at least one object, a speed of the at least one object, a direction of the at least one object, or a combination thereof, based on transmitting the first instance of the radar waveform, or the second instance of the radar waveform, or both. In some cases, the range value includes a maximum range value.

The interference manager 1035 may identify interference generated by transmitting the first instance of the radar waveform and transmitting the second instance of the radar waveform. In some examples, the interference manager 1035 may apply a filter to the interference based on the offset value, where identifying the at least one object is based on applying the filter. In some examples, the interference manager 1035 may determine that the third radar transmitter, the fourth radar transmitter, or both, do not interfere with the first radar transmitter and the second radar transmitter.

FIG. 11 shows a diagram of a system 1100 including a device 1105 that supports radar interference mitigation in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may determine a configuration for transmitting a radar waveform by a set of radar transmitters of the vehicle, the configuration indicating an offset value for the radar waveform between a first radar transmitter of the set of radar transmitters and a second radar transmitter of the set of radar transmitters, transmit, by the first radar transmitter, a first instance of the radar waveform, transmit, by the second radar transmitter, a second instance of the radar waveform that is offset from the first instance of the radar waveform by the offset value, and identify at least one object based on transmitting the first instance of the radar waveform, or the second instance of the radar waveform, or both.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting radar interference mitigation).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The radar sensor 1150 may include one or more of at least one convertor, a VCO, an RF generator, a divider, at least one amplifier, a Mixer, or any combination thereof. In some cases, the radar sensor 1150 may be controlled by the communications manager to perform the functions described herein. The radar sensor 1150 may include one or more antennas. The antennas may be included in an array with one or more antennas 1125, or may be a separate antenna array. The antennas may transmit and receive radar signals, as described herein. The radar sensor may be configured as described with reference to FIG. 3.

Figure 12:
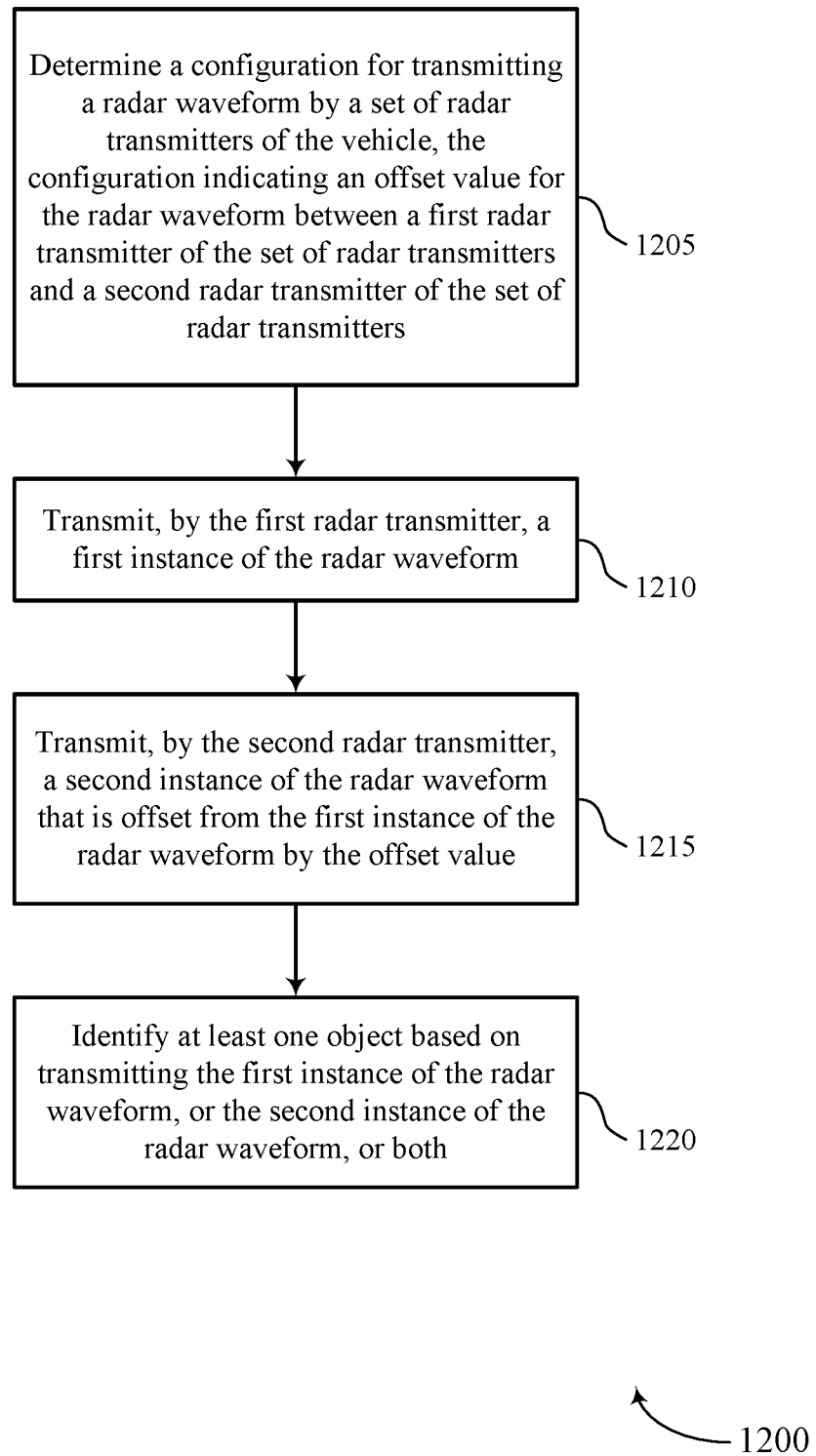
FIGS. 12 and 13 show flowcharts illustrating methods that support radar interference mitigation in accordance with aspects of the present disclosure.

FIG. 12 shows a flowchart illustrating a method 1200 that supports radar interference mitigation in accordance with aspects of the present disclosure. The operations of method 1200 may be implemented by a UE 115 or its components as described herein. For example, the operations of method 1200 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1205, the UE may determine a configuration for transmitting a radar waveform by a set of radar transmitters of the vehicle, the configuration indicating an offset value for the radar waveform between a first radar transmitter of the set of radar transmitters and a second radar transmitter of the set of radar transmitters. The operations of 1205 may be performed according to the methods described herein. In some examples, aspects of the operations of 1205 may be performed by a radar configuration manager as described with reference to FIGS. 8 through 11.

At 1210, the UE may transmit, by the first radar transmitter, a first instance of the radar waveform. The operations of 1210 may be performed according to the methods described herein. In some examples, aspects of the operations of 1210 may be performed by a radar waveform manager as described with reference to FIGS. 8 through 11.

At 1215, the UE may transmit, by the second radar transmitter, a second instance of the radar waveform that is offset from the first instance of the radar waveform by the offset value. The operations of 1215 may be performed according to the methods described herein. In some examples, aspects of the operations of 1215 may be performed by an offset value manager as described with reference to FIGS. 8 through 11.

At 1220, the UE may identify at least one object based on transmitting the first instance of the radar waveform, or the second instance of the radar waveform, or both. The operations of 1220 may be performed according to the methods described herein. In some examples, aspects of the operations of 1220 may be performed by an object identification manager as described with reference to FIGS. 8 through 11.

Figure 13:
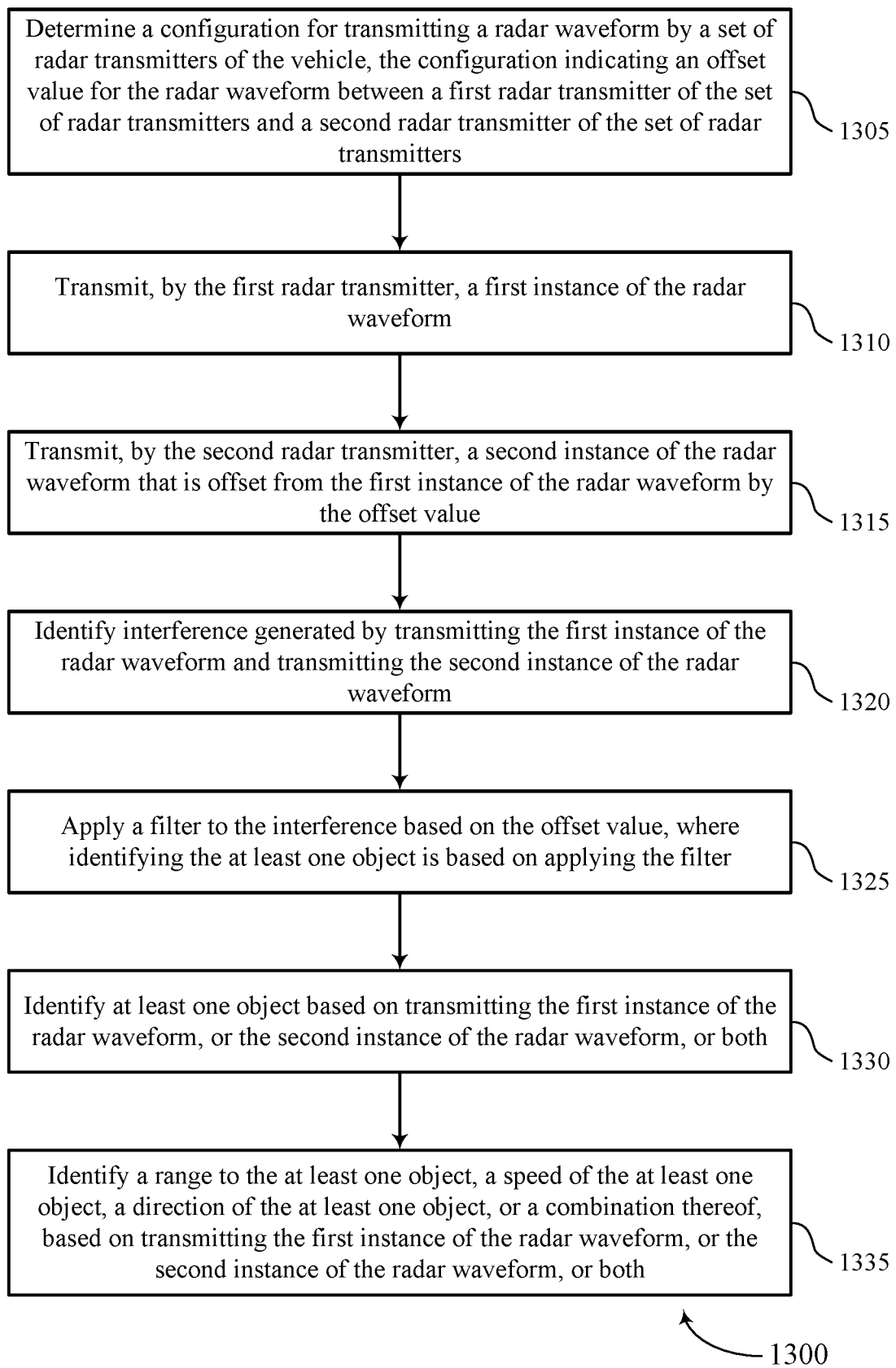

FIG. 13 shows a flowchart illustrating a method 1300 that supports radar interference mitigation in accordance with aspects of the present disclosure. The operations of method 1300 may be implemented by a UE 115 or its components as described herein. For example, the operations of method 1300 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1305, the UE may determine a configuration for transmitting a radar waveform by a set of radar transmitters of the vehicle, the configuration indicating an offset value for the radar waveform between a first radar transmitter of the set of radar transmitters and a second radar transmitter of the set of radar transmitters. The operations of 1305 may be performed according to the methods described herein. In some examples, aspects of the operations of 1305 may be performed by a radar configuration manager as described with reference to FIGS. 8 through 11.

At 1310, the UE may transmit, by the first radar transmitter, a first instance of the radar waveform. The operations of 1310 may be performed according to the methods described herein. In some examples, aspects of the operations of 1310 may be performed by a radar waveform manager as described with reference to FIGS. 8 through 11.

At 1315, the UE may transmit, by the second radar transmitter, a second instance of the radar waveform that is offset from the first instance of the radar waveform by the offset value. The operations of 1315 may be performed according to the methods described herein. In some examples, aspects of the operations of 1315 may be performed by an offset value manager as described with reference to FIGS. 8 through 11.

At 1320, the UE may identify interference generated by transmitting the first instance of the radar waveform and transmitting the second instance of the radar waveform. The operations of 1320 may be performed according to the methods described herein. In some examples, aspects of the operations of 1320 may be performed by an interference manager as described with reference to FIGS. 8 through 11.

At 1325, the UE may apply a filter to the interference based on the offset value, where identifying the at least one object is based on applying the filter. The operations of 1325 may be performed according to the methods described herein. In some examples, aspects of the operations of 1325 may be performed by an interference manager as described with reference to FIGS. 8 through 11.

At 1330, the UE may identify at least one object based on transmitting the first instance of the radar waveform, or the second instance of the radar waveform, or both. The operations of 1330 may be performed according to the methods described herein. In some examples, aspects of the operations of 1330 may be performed by an object identification manager as described with reference to FIGS. 8 through 11.

At 1335, the UE may identify a range to the at least one object, a speed of the at least one object, a direction of the at least one object, or a combination thereof, based on transmitting the first instance of the radar waveform, or the second instance of the radar waveform, or both. The operations of 1335 may be performed according to the methods described herein. In some examples, aspects of the operations of 1335 may be performed by a range value manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a vehicle, comprising: determining a configuration for transmitting a radar waveform by a plurality of radar transmitters of the vehicle, the configuration indicating an offset value for the radar waveform between a first radar transmitter of the plurality of radar transmitters and a second radar transmitter of the plurality of radar transmitters; transmitting, by the first radar transmitter, a first instance of the radar waveform; transmitting, by the second radar transmitter, a second instance of the radar waveform that is offset from the first instance of the radar waveform by the offset value; and identifying at least one object based at least in part on transmitting the first instance of the radar waveform, or the second instance of the radar waveform, or both.

Aspect 2: The method of aspect 1, further comprising: identifying a range value based at least in part on a filtering bandwidth value; and determining, based at least in part on the range value, the offset value.

Aspect 3: The method of aspect 2, wherein the range value comprises a maximum range value.

Aspect 4: The method of any of aspects 1 through 3, further comprising: identifying interference generated by transmitting the first instance of the radar waveform and transmitting the second instance of the radar waveform; and applying a filter to the interference based at least in part on the offset value, wherein identifying the at least one object is based at least in part on applying the filter.

Aspect 5: The method of any of aspects 1 through 4, wherein the offset value comprises a time offset.

Aspect 6: The method of any of aspects 1 through 5, wherein the offset value comprises a frequency offset.

Aspect 7: The method of any of aspects 1 through 6, wherein the offset value comprises a combination of a time offset and a frequency offset.

Aspect 8: The method of any of aspects 1 through 7, wherein the configuration indicates a second offset value for the radar waveform between a third radar transmitter of the plurality of radar transmitters and a fourth radar transmitter of the plurality of radar transmitters, the method further comprising: determining that the third radar transmitter, the fourth radar transmitter, or both, do not interfere with the first radar transmitter and the second radar transmitter; transmitting, by the third radar transmitter, a third instance of the radar waveform; and transmitting, by the fourth radar transmitter, a fourth instance of the radar waveform that is offset from the third instance of the radar waveform by the second offset value.

Aspect 9: The method of any of aspects 1 through 8, wherein the configuration indicates one or more of a set of radar waveform chirps, a radar waveform carrier frequency range, a radar waveform frequency sweeping direction, a radar waveform frequency sweeping rate, or any combination thereof.

Aspect 10: The method of any of aspects 1 through 9, further comprising: identifying a range to the at least one object, a speed of the at least one object, a direction of the at least one object, or a combination thereof, based at least in part on transmitting the first instance of the radar waveform, or the second instance of the radar waveform, or both.

Aspect 11: The method of any of aspects 1 through 10, wherein the radar waveform comprises a frequency modulated continuous wave.

Aspect 12: The method of aspect 11, wherein the frequency modulated continuous wave comprises a triangle wave that rises from a first frequency to a second frequency over a first time duration and falls from the second frequency to the first frequency over a second time duration.

Aspect 13: An apparatus for wireless communications at a vehicle, comprising a processor; memory coupled with the processor; and instructions stored in the memory and executable by the processor to cause the apparatus to perform a method of any of aspects 1 through 12.

Aspect 14: An apparatus for wireless communications at a vehicle, comprising at least one means for performing a method of any of aspects 1 through 12.

Aspect 15: A non-transitory computer-readable medium storing code for wireless communications at a vehicle, the code comprising instructions executable by a processor to perform a method of any of aspects 1 through 12.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a vehicle, comprising:

receiving, from a second vehicle, an indication of an offset value, the offset value between radar waveforms transmitted by a first radar transmitter and a second radar transmitter of a plurality of radar transmitters of the vehicle, wherein the offset value is based at least in part on a range value associated with a range of interest, and wherein the offset value comprises a time offset;

determining a configuration for transmitting a radar waveform by the plurality of radar transmitters of the vehicle, the configuration indicating a frequency range associated with the radar waveform and indicating to sweep the radar waveform over the frequency range over time;

transmitting, by the first radar transmitter, a first instance of the radar waveform in accordance with the configuration;

transmitting, by the second radar transmitter, a second instance of the radar waveform that is offset from the first instance of the radar waveform by the offset value in accordance with the configuration, wherein the second instance of the radar waveform at least partially overlaps with the first instance of the radar waveform in time in accordance with the time offset;

identifying interference between the first instance of the radar waveform and the second instance of the radar waveform associated with a ghost object located beyond an upper distance value of the range of interest;

applying a filter to the interference based at least in part on the offset value; and identifying at least one object based at least in part on applying the filter and transmitting the first instance of the radar waveform and the second instance of the radar waveform.

2. The method of claim 1, further comprising:

identifying the range value associated with the range of interest based at least in part on a filtering bandwidth value, wherein the range value indicates a distance from the vehicle; and determining, based at least in part on the range value, the offset value.

3. The method of claim 2, wherein the range value comprises a maximum range value.

4. The method of claim 1, wherein the time offset is based at least in part on an integer and a time delay value.

5. The method of claim 1, wherein the offset value comprises a frequency offset.

6. The method of claim 1, wherein the offset value comprises a combination of a time offset and a frequency offset.

7. The method of claim 1, wherein the configuration indicates a second offset value for the radar waveform between a third radar transmitter of the plurality of radar transmitters and a fourth radar transmitter of the plurality of radar transmitters, the method further comprising:

determining that the third radar transmitter, the fourth radar transmitter, or both, do not interfere with the first radar transmitter and the second radar transmitter;

transmitting, by the third radar transmitter, a third instance of the radar waveform; and transmitting, by the fourth radar transmitter, a fourth instance of the radar waveform that is offset from the third instance of the radar waveform by the second offset value.

8. The method of claim 1, wherein the configuration indicates one or more of a set of radar waveform chirps, a radar waveform carrier frequency range, a radar waveform frequency sweeping direction, a radar waveform frequency sweeping rate, or any combination thereof.

9. The method of claim 1, further comprising:

identifying a range to the at least one object, a speed of the at least one object, a direction of the at least one object, or a combination thereof, based at least in part on transmitting the first instance of the radar waveform, or the second instance of the radar waveform, or both.

10. The method of claim 1, wherein the radar waveform comprises a frequency modulated continuous wave.

11. The method of claim 10, wherein the frequency modulated continuous wave comprises a triangle wave that rises from a first frequency to a second frequency over a first time duration and falls from the second frequency to the first frequency over a second time duration.

12. An apparatus for wireless communications at a vehicle, comprising:

one or more memories storing processor-executable code; and one or more processors coupled with the one or more memories and operable to execute the code to cause the apparatus to:

receive, from a second vehicle, an indication of an offset value, the offset value between radar waveforms transmitted by a first radar transmitter and a second radar transmitter of a plurality of radar transmitters of the vehicle, wherein the offset value is based at least in part on a range value associated with a range of interest, and wherein the offset value comprises a time offset;

determine a configuration for transmitting a radar waveform by the plurality of radar transmitters of the vehicle, the configuration indicating a frequency range associated with the radar waveform and indicating to sweep the radar waveform over the frequency range over time;

transmit, by the first radar transmitter, a first instance of the radar waveform in accordance with the configuration;

transmit, by the second radar transmitter, a second instance of the radar waveform that is offset from the first instance of the radar waveform by the offset value in accordance with the configuration, wherein the second instance of the radar waveform at least partially overlaps with the first instance of the radar waveform in time in accordance with the time offset;

identify interference between the first instance of the radar waveform and the second instance of the radar waveform associated with a ghost object located beyond an upper distance value of the range of interest;

apply a filter to the interference based at least in part on the offset value; and identify at least one object based at least in part on application of the filter and transmission of the first instance of the radar waveform and the second instance of the radar waveform.

13. The apparatus of claim 12, wherein the one or more processors are operable to cause the apparatus to:

identify the range value associated with the range of interest based at least in part on a filtering bandwidth value, wherein the range value indicates a distance from the vehicle; and determine, based at least in part on the range value, the offset value.

14. The apparatus of claim 13, wherein the range value comprises a maximum range value.

15. The apparatus of claim 12, wherein the time offset is based at least in part on an integer and a time delay value.

16. The apparatus of claim 12, wherein the offset value comprises a frequency offset.

17. The apparatus of claim 12, wherein the offset value comprises a combination of a time offset and a frequency offset.

18. The apparatus of claim 12, wherein the configuration indicates a second offset value for the radar waveform between a third radar transmitter of the plurality of radar transmitters and a fourth radar transmitter of the plurality of radar transmitters, and the one or more processors are operable to cause the apparatus to:

determine that the third radar transmitter, the fourth radar transmitter, or both, do not interfere with the first radar transmitter and the second radar transmitter;

transmit, by the third radar transmitter, a third instance of the radar waveform; and transmit, by the fourth radar transmitter, a fourth instance of the radar waveform that is offset from the third instance of the radar waveform by the second offset value.

19. The apparatus of claim 12, wherein the configuration indicates one or more of a set of radar waveform chirps, a radar waveform carrier frequency range, a radar waveform frequency sweeping direction, a radar waveform frequency sweeping rate, or any combination thereof.

20. The apparatus of claim 12, wherein the one or more processors are operable to cause the apparatus to:
identify a range to the at least one object, a speed of the at least one object, a direction of the at least one object, or a combination thereof, based at least in part on transmitting the first instance of the radar waveform, or the second instance of the radar waveform, or both.

21. The apparatus of claim 12, wherein the radar waveform comprises a frequency modulated continuous wave.

22. The apparatus of claim 21, wherein the frequency modulated continuous wave comprises a triangle wave that rises from a first frequency to a second frequency over a first time duration and falls from the second frequency to the first frequency over a second time duration.

23. An apparatus for wireless communications at a vehicle, comprising:
means for receiving, from a second vehicle, an indication of an offset value, the offset value between radar waveforms transmitted by a first radar transmitter and a second radar transmitter of a plurality of radar transmitters of the vehicle, wherein the offset value is based at least in part on a range value associated with a range of interest, and wherein the offset value comprises a time offset;
means for determining a configuration for transmitting a radar waveform by the plurality of radar transmitters of the vehicle, the configuration indicating a frequency range associated with the radar waveform and indicating to sweep the radar waveform over the frequency range over time;
means for transmitting, by the first radar transmitter, a first instance of the radar waveform in accordance with the configuration;
means for transmitting, by the second radar transmitter, a second instance of the radar waveform that is offset from the first instance of the radar waveform by the offset value in accordance with the configuration, wherein the second instance of the radar waveform at least partially overlaps with the first instance of the radar waveform in time in accordance with the time offset;
means for identifying interference between the first instance of the radar waveform and the second instance of the radar waveform associated with a ghost object located beyond an upper distance value of the range of interest;
means for applying a filter to the interference based at least in part on the offset value; and
means for identifying at least one object based at least in part on application of the filter and transmission of the first instance of the radar waveform and the second instance of the radar waveform.

24. The apparatus of claim 23, further comprising:
means for identifying the range value associated with the range of interest based at least in part on a filtering bandwidth value, wherein the range value indicates a distance from the vehicle; and
means for determining, based at least in part on the range value, the offset value.

25. The apparatus of claim 23, wherein the configuration indicates a second offset value for the radar waveform between a third radar transmitter of the plurality of radar transmitters and a fourth radar transmitter of the plurality of radar transmitters, the apparatus further comprising:
means for determining that the third radar transmitter, the fourth radar transmitter, or both, do not interfere with the first radar transmitter and the second radar transmitter;
means for transmitting, by the third radar transmitter, a third instance of the radar waveform; and
means for transmitting, by the fourth radar transmitter, a fourth instance of the radar waveform that is offset from the third instance of the radar waveform by the second offset value.

26. The apparatus of claim 23, further comprising:
means for identifying a range to the at least one object, a speed of the at least one object, a direction of the at least one object, or a combination thereof, based at least in part on transmitting the first instance of the radar waveform, or the second instance of the radar waveform, or both.

27. A non-transitory computer-readable medium storing code for wireless communications at a vehicle, the code comprising instructions executable by one or more processors to:
receive, from a second vehicle, an indication of an offset value, the offset value between radar waveforms transmitted by a first radar transmitter and a second radar transmitter of a plurality of radar transmitters of the vehicle, wherein the offset value is based at least in part on a range value associated with a range of interest, and wherein the offset value comprises a time offset;
determine a configuration for transmitting a radar waveform by the plurality of radar transmitters of the vehicle, the configuration indicating a frequency range associated with the radar waveform and indicating to sweep the radar waveform over the frequency range over time;
transmit, by the first radar transmitter, a first instance of the radar waveform in accordance with the configuration;
transmit, by the second radar transmitter, a second instance of the radar waveform that is offset from the first instance of the radar waveform by the offset value in accordance with the configuration, wherein the second instance of the radar waveform at least partially overlaps with the first instance of the radar waveform in time in accordance with the time offset;
identify interference between the first instance of the radar waveform and the second instance of the radar waveform associated with a ghost object located beyond an upper distance value of the range of interest;
apply a filter to the interference based at least in part on the offset value; and
identify at least one object based at least in part on application of the filter and transmission of the first instance of the radar waveform and the second instance of the radar waveform.

* * * * *